(12) United States Patent
Xu et al.

(10) Patent No.: US 6,965,883 B2
(45) Date of Patent: Nov. 15, 2005

(54) CHARGING MECHANISM FOR MULTICASTING

(75) Inventors: Lin Xu, Lempäälä (FI); Jarno Leinonen, Tampere (FI)

(73) Assignee: Nokia Corporation, Espoo (FI)

( * ) Notice: Subject to any disclaimer, the term of this patent is extended or adjusted under 35 U.S.C. 154(b) by 226 days.

(21) Appl. No.: 10/077,780

(22) Filed: Feb. 20, 2002

(65) Prior Publication Data

US 2003/0172165 A1 Sep. 11, 2003

(51) Int. Cl.[7] .............................................. G06F 17/60
(52) U.S. Cl. .......................... 705/418; 377/16; 705/400
(58) Field of Search ..................... 377/15, 16; 705/400, 705/417, 418

(56) References Cited

U.S. PATENT DOCUMENTS

| | | | | |
|---|---|---|---|---|
| 5,606,497 A | * | 2/1997 | Cramer et al. | 395/232 |
| 5,757,784 A | | 5/1998 | Liebowitz et al. | 370/321 |
| 5,905,871 A | | 5/1999 | Buskens et al. | 395/200.75 |
| 6,011,841 A | * | 1/2000 | Isono | 379/201.01 |
| 6,122,263 A | | 9/2000 | Dahlin et al. | 370/329 |
| 6,243,450 B1 | | 6/2001 | Jansen et al. | 379/144 |
| 6,363,137 B1 | * | 3/2002 | Nakao et al. | 379/1.01 |
| 6,424,704 B1 | * | 7/2002 | Lee | 379/112.01 |
| 6,453,438 B1 | | 9/2002 | Miller et al. | 714/749 |
| 2002/0002470 A1 | * | 1/2002 | Arai | 705/1 |
| 2002/0062289 A1 | * | 5/2002 | Kondo | 705/52 |
| 2002/0077981 A1 | * | 6/2002 | Takatori et al. | 705/40 |

FOREIGN PATENT DOCUMENTS

| | | |
|---|---|---|
| DE | 4331432 A1 * | 6/1995 |
| EP | 1 126 656 A2 | 8/2001 |
| JP | 2001-160960 | 12/1999 |
| WO | WO00/64123 | 10/2000 |

OTHER PUBLICATIONS

PCNetter: "SPECIAL REPORT: Cisco Systems' Universal Access Servers", Apr. 1, 1996, vol. 11, No. 4.*
C.K. Wong et al., "Secure Group Communications Using Key Graphs", IEEE/ACM Transactions on Networking, vol. 8, No. 1, Feb. 2000, pp. 16–30, XP002276908.
S. Deering, "Host Extensions for IP Multicasting", RFC 1112, Stanford University, Aug. 1989, pp. 1–17.
W. Fenner, "Internet Group Management Protocol, Version 2", RFC 2236, Xerox PARC, Nov. 1997, pp. 1–24.
C. Wong et al., "Secure Group Communications Using Key Graphs", IEEE/ACM Transactions on Networking, vol. 8, No. 1, Feb. 2000, pp. 16–30.
Johnson et al. "How IP Multicast Works", Stardust.com, Inc., Nov. 20, 2001, pp. 1–9.
"Configuring IP Multicast Routing", pp. PC1–217–268.

* cited by examiner

*Primary Examiner*—Edward Cosimano
(74) *Attorney, Agent, or Firm*—Morgan & Finnegan, LLP

(57) ABSTRACT

An apparatus for calculating a cost of receiving multicast data from a multicast session. A multicast network includes at least one multicast service, each multicast service including at least one multicast session. The apparatus receives a request to establish a connection to the multicast session, stores a start time for the connection and an end time for the connection and, after termination of the connection, calculates the cost of receiving the multicast data The apparatus can receive a subsequent request to extend the connection, the subsequent request specifying a new end time for the connection, and store the new end time for the connection. Alternatively, the apparatus can receive a subsequent request to terminate the connection, the subsequent request specifying a new end time that precedes the end time for the connection, and store the new end time for the connection.

42 Claims, 17 Drawing Sheets

CHARGING MECHANISM FOR MULTICASTING

CROSS-REFERENCE TO A RELATED APPLICATION

This application for letters patent is related to and incorporates by reference application for letters patent Ser. No. 10/008,334, titled "A System and Method for Efficient Distribution of Multicastable Services", and filed in the United States Patent and Trademark Office on Dec. 6, 2001.

FIELD OF THE INVENTION

The invention disclosed herein is a method, system, and computer program product for calculating a cost of receiving multicast data from a multicast session. In particular, the method, system, and computer program product calculates the cost of receiving multicast data based on either the elapsed time that a user connects to a multicast session, or the volume of data received at a destination during the connection period.

BACKGROUND OF THE INVENTION

A one-to-many or many-to-many Internet Protocol (IP) application involves one or multiple sources sending IP messages to multiple receivers. Exemplary applications include the transmission of corporate messages to employees, communication of stock quotes to brokers, video and audio conferencing for remote meetings and telecommuting, and replicating databases and web site information. The IP multicast protocol efficiently supports one-to-many or many-to-many applications by allowing a source to send a single copy of a message to any recipient who explicitly requests to receive the message. IP multicast is more efficient than a point-to-point unicast protocol that requires the source to send an individual copy of a message to each requester thereby limiting the number of receivers by the bandwidth available to the sender. IP multicast is also more efficient than a broadcast protocol that sends one copy of a message to every node on the network even though many of the nodes may not want the message and the broadcast protocol is limited to a single subnet. Furthermore, the IP multicast protocol is applicable not only to wired networks, but also wireless networks. For example, in wireless network, link level multicasting allows several terminals to receive data sent over a single air interface.

IP Multicast is a receiver-based protocol. A receiver subscribes to a multicast session group by sending a join message to the multicast session group. Since the network infrastructure delivers the traffic to each member of the multicast session group, the sender does not need to maintain a list of receivers. The advantage is that only one copy of a multicast message passes over any link in the network. In addition, IP Multicast only creates a copy of the message when the paths diverge at a router. Thus, EP multicast yields many performance improvements and conserves bandwidth throughout the system.

IP multicast is an extension to the standard IP network-level protocol. RFC 1112, titled "Host Extensions for IP Multicasting" and authored by Steve Deering in 1989, describes IP multicasting as "the transmission of an IP datagram to a 'host group', a set of zero or more hosts identified by a single IP destination address. IP multicasting delivers a multicast datagram to every member of the destination host group with the same 'best-efforts' reliability as regular unicast IP datagrams. The membership of a host group is dynamic; that is, hosts may join and leave groups at any time. There is no restriction on the location or number of members in a host group. A host may be a member of more than one group at a time." In addition, at the application level, a single group address may have multiple data streams on different port numbers, on different sockets, in one or more applications. Multiple applications may share a ingle group address on a host.

Multicast communications to establish host membership in a multicast group (e.g., a join message) utilize a standard, such as the Internet Group Management Protocol (IGMP), that supports multicast communication at the Open System Interconnection (OSI) data link layer (layer 2). W. Fenner, Internet Group Management Protocol, Version 2, Request for Comments (RFC) 2236, November, 1997, describe IGMP.

In a shared transport media network, encryption takes place at the Open Systems Initiative (OSI) link level (level 2) to prevent an unintended user on the same point-to-multipoint link to get the multicast packets. Alternatively, Internet Protocol security (IPsec) and tunneling can achieve the same result. In addition, in a shared transport network, it is difficult for a provider to determine a total charge to associate with a multicast service between a source and a user because the total charge comprises a content charge and a delivery charge. The source determines the fee associated with the content charge based on the copyright of the content, the volume of data, or a digital right management (DRM) solution. In contrast, the resources consumed during the delivery of the content to a user such as a content provider dictate the delivery charge. In a wireless network, for example, the resources consumed may include wireless radio resources. The content provider is the owner of the multicast data source, however the actual data may be obtained from a third party who owns the copyright to the content.

The content charge and the delivery charge also differ because the content charge accrues against the user and the delivery charge can accrue against either the content provider or the user. If the delivery charge accrues against the content provider for sending the content over a physical network, the accrual of the charge can be on a program basis, a data volume basis, or a time basis. Accrual of the delivery charge against the content provider is suitable for delivering content such as an advertisement because the content delivery benefits the content. The disadvantage, however, is that accrual of the delivery charge against the content provider requires a service agreement between the content provider and the network operator. Thus, when the delivery charge accrues against the content provider, it is not possible to charge for delivery of multicast services originating from any content provider on Internet. If the delivery charge accrues against the user for receiving the content over a physical network, it is difficult to track the volume of data that the user receives. Thus, only two types of charging mechanisms are possible, flat rate charging and program or file based charging. Flat rate charging requires the user to periodically pay a fixed price for using the service. Program or file based charging requires the user to pay a fee for each request to receive a program or file. In response to the payment, the user receives an encryption key that will allow access to the program or file. The program or file can include a software application, audio/video file, or graphic image. The encryption scheme can include link level encryption or IPsec.

Sophisticated and cost-effective charging mechanisms, such as time based charging and data volume based charging, have taken the place of flat rate charging and program or file based charging mechanisms. A charging scheme based on connection time will calculate a fee for a service based on the amount of time that a user connects to the service. For example, if a network operator determines that the rate for using a video service is $5.00 per hour, a user connecting to the video service to view a movie for thirty-minutes accrues a fee of $2.50. A charging scheme based on the volume of data will calculate a fee for a service based on the volume of data that a user receives from the service. For example, if a network operator determines that the rate for using a video service is $0.25 per Megabyte of data received, the fee for a user to use the video service to view a movie consisting of 25 Megabytes is $6.25.

Currently, time based charging and data volume based charging mechanisms are not available for IP multicast deployed in a network with shared transport media Since it is difficult to determine when a user has stopped using a shared transport media service, it is difficult for network to calculate the connection time or data volume received. For example, user may establish a multicast connection through a digital broadcast network, but when the battery in the user's terminal loses a charge, the connection is broken without any indication of disjoining the service. Thus, the charging will continue even though the multicast service is no longer in use. Furthermore, security is a problem because the user has the possibility to disjoin the service, but still receives the data from the shared transport media service. This invention disclosed here is one possible solution to establish a secure billing system for multicast service in a network that is capable for link level multicasting.

Thus, there is a need for a system, method, and computer program product for calculating a cost of receiving multicast data from a multicast session. The system, method, and computer program product will calculate the cost of receiving multicast data based on either the elapsed time that a user connects to a multicast session, or the volume of data received at a destination during the connection period. The system, method, and computer program product disclosed herein establish a secure billing system for multicast services in a network that provides link level multicasting.

SUMMARY OF THE INVENTION

A method, system, and computer program product for calculating a cost of receiving multicast data from a multicast session. A multicast network includes at least one multicast service, each multicast service including at least one multicast session. The method, system, and computer program product receives a request to establish a connection to the multicast session, the request including a start time for the connection and an end time for the connection. The method, system, and computer program product stores the start time for the connection and the end time for the connection and, after termination of the connection, calculates the cost of receiving the multicast data.

The method, system, and computer program product can receive a subsequent request to extend the connection, the subsequent request specifying a new end time for the connection, and store the new end time for the connection. Alternatively, the method, system, and computer program product can receive a subsequent request to terminate the connection, the subsequent request specifying a new end time that precedes the end time for the connection, and store the new end time for the connection.

In one embodiment, the storing of the start time for the connection and the end time for the connection is to a database.

To calculate the cost, the method, system, and computer program product computes a charge for receiving the multicast data, stores the charge, and computes the cost by multiplying the charge by a fee for the multicast service associated with the multicast session. In one embodiment, the storing of the charge is to a database. The method, system, and computer program product can compute an elapsed connection time by subtracting the start time for the connection from the end time for the connection. Alternatively, the method, system, and computer program product can compute a volume of data received over the connection from the start time for the connection to the end time for the connection.

In another embodiment, time is divided into evenly spaced time slots such that the start time for the connection the end time for the connection can only occur at the end of a time slot. Alternatively, the end time for the connection in the request is specified as a discrete number of time slots.

In another embodiment, the system for calculating a cost of receiving multicast data from a multicast session includes a collection device and an interface device. The collection device is a general-purpose computer configured to receive a request to establish a connection to the multicast session, the request including a start time for the connection and an end time for the connection, store the start time for the connection and the end time for the connection, and after termination of the connection, calculate the cost of receiving the multicast data. The interface device is a general-purpose computer configured to configure the collection device and display the cost of receiving the multicast data.

BRIEF DESCRIPTION OF THE DRAWINGS

The accompanying figures best illustrate the details of the system, method, and computer program product that establishes a secure billing system for multicast services in a network that provides link level multicasting, both as to its structure and operation. Like reference numbers and designations in the accompanying figures refer to like elements.

DETAILED DESCRIPTION OF THE INVENTION

Figure 1A:
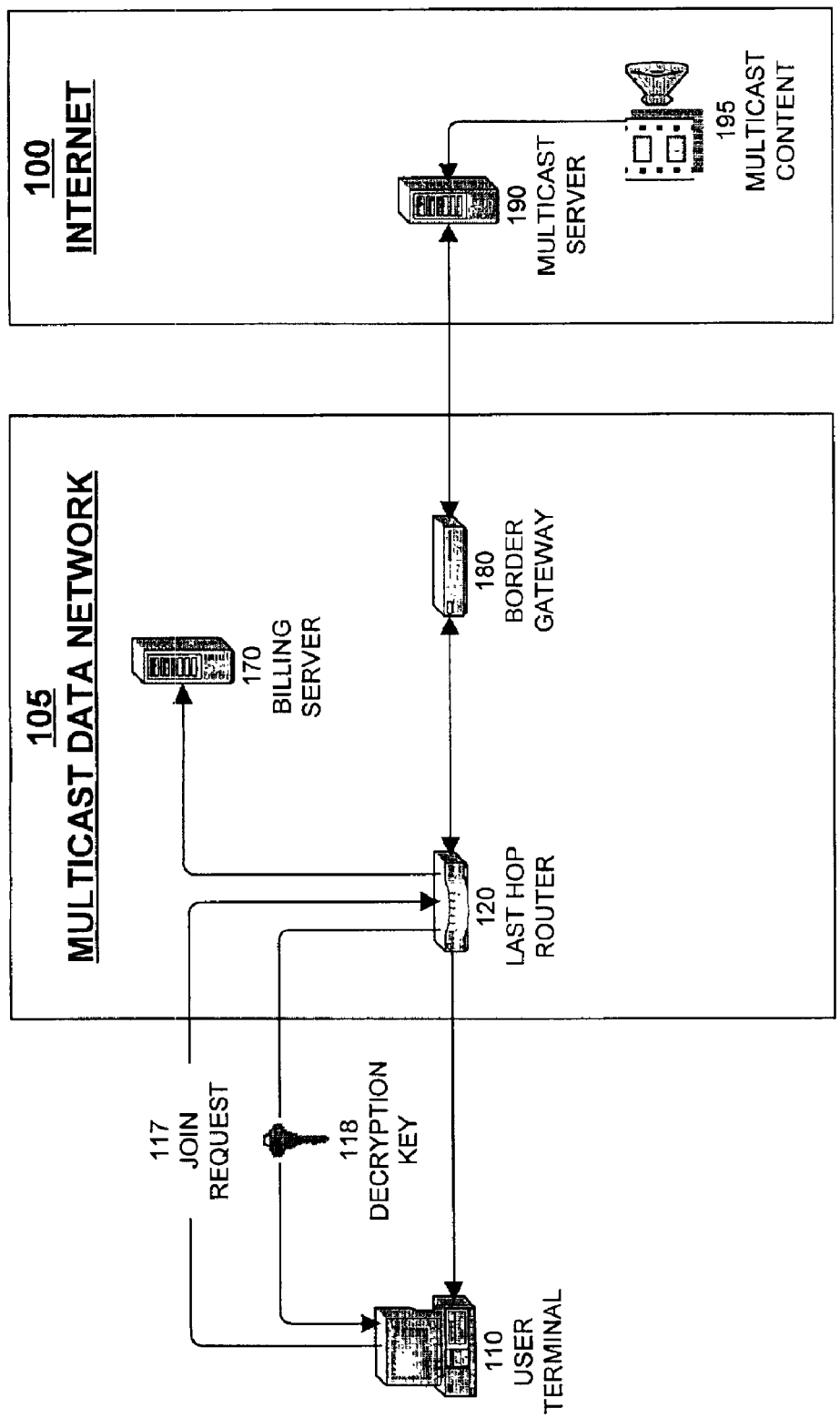
FIG. 1A is a network diagram that illustrates an operating environment of a secure billing system for multicast network services in a network that provides link level multicasting.

FIG. 1A is a network diagram that illustrates an operating environment of a secure billing system for multicast network services in a network that provides link level multicasting. Internet 100 and multicast data network 105, as shown in FIG. 1A, are public communication networks that support multicast delivery of data packets, in general, and multicast delivery of Internet protocol (IP) data packets, in particular. The invention disclosed herein contemplates network architectures comparable to Internet 100 and multicast data network 105 such as a cellular network, a satellite network, a digital video broadcasting (DVB) network, or a private network architecture. Private network architectures include a local area network, a personal area network such as a Bluetooth network, an intranet, or an extranet. An intranet is a private communication network that provides an organization, such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The invention disclosed herein also contemplates network protocols such as Ethernet, Token Ring, and proprietary network protocols comparable to the Internet protocol.

As shown in FIG. 1A, user terminal 110 includes an interface module that connects a user to the secure billing system for multicast network services. In one embodiment, user terminal 110 is a general-purpose computer. User terminal 110 also includes a communication module to communicate with devices on multicast data network 105 to receive multicast session data from devices on Internet 100. A user operates user terminal 110 to receive multicast content 195 by sending join request 117 to last hop router 120. After receiving join request 117, last hop router 120 attaches to the multicast tree using any existing multicast routing protocol. In one embodiment, last hop router 120 attaches to the multicast tree via border gateway 180. Last hop router 120 and border gateway 180 perform routing functions for multicast data network 105. Last hop router 120 is the last routing entity that handles data passing from multicast capable data network 105 to user terminal 110. For example, last hop router 120 may be a general-purpose router in a wireless local area network (WLAN) or a Serving General Packet Radio Service (GPRS) Support Node (SGSN) in a GPRS or Universal Mobile Telecommunications System (UMTS) network. Border gateway 180 is the routing entity that provides the interface between multicast data network 105 and an external network such as Internet 100. In response to join request 117, user terminal 110 receives decryption key 118 from multicast data network 105. In one embodiment, last hop router 120 is responsible for sending decryption key 118 to user terminal 110 and encrypts the data sent by multicast server 190 prior to forwarding the data to user terminal 110. In addition to data routing, last hop router 120 monitors multicast communication messages that user terminal 110 sends and receives, stores charging data related to a subscription request, and forwards the charging data to billing server 170, a general-purpose server computer. Billing server 170 converts the charging data into billing data, stores the billing data, and notifies the user of the total charge for subscribing to multicast content 195.

In another embodiment of the secure billing system shown in FIG. 1A, multicast data network 105 is a visiting wireless network for user terminal 110. Since billing server 170 is not in the home network for user terminal 110, billing server 170 forwards any billing data for user terminal 110 to the home billing server (not shown) in the home network (not shown) for user terminal 110. The home network (not shown) will connect to either multicast data network 105 or Internet 100 via a connecting border gateway (not shown).

In another embodiment of the secure billing system shown in FIG. 1A, the functions comprising collection of the charging data that last hop router 120 performs are distributed throughout multicast data network 105 to reduce the processing load imposed upon last hop router 120. For example, if the charging data includes connection time data and throughput volume data, last hop router 120 can be responsible for collecting the time data and an intermediate router (not shown) along the multicast tree in multicast data network 105 can be responsible for collecting the throughput volume data.

In another embodiment of the secure billing system shown in FIG. 1A, the operator of multicast data network 105 provides the multicast service. Thus, multicast server 190 is located in multicast data network 105.

In another embodiment of the secure billing system shown in FIG. 1A, billing server 170 is located in another physical network such as Internet 100 and connects with multicast data network 105 via a Virtual Private Network (VPN). Alternatively, last hop router 120 can also include the functionality performed by billing server 170. Thus, last hop router 120 will include a module that converts charging data into billing data, stores the billing data temporarily and periodically forwards the billing data to a billing center.

Figure 1B:
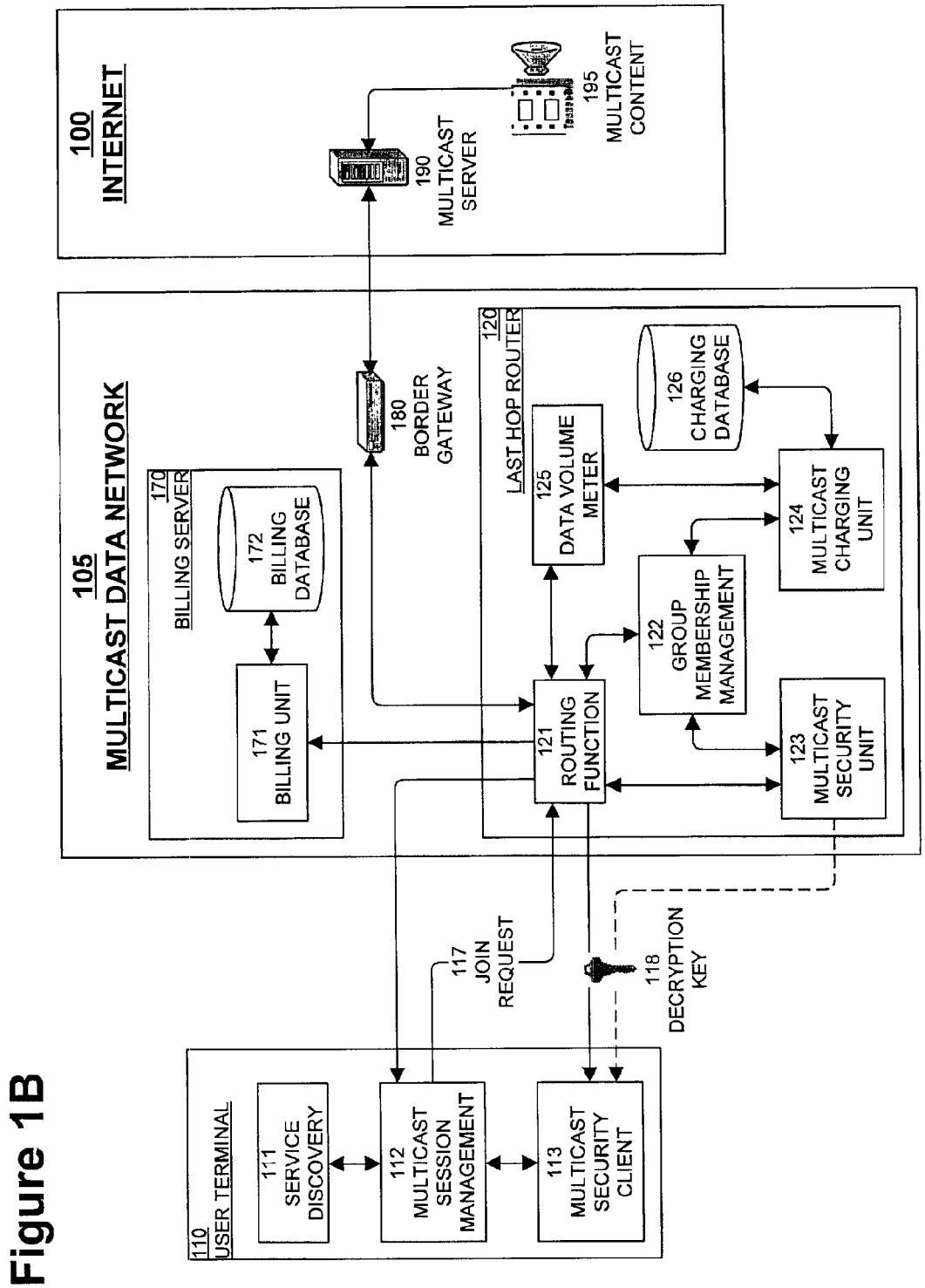
FIG. 1B is a network diagram that illustrates the components comprising the secure billing system shown in FIG. 1A.

FIG. 1B is a network diagram that illustrates the components comprising the secure billing system shown in FIG. 1A. User terminal 110 comprises service discovery 111, multicast session management 112, and multicast security client 113. Service discovery 111 enables the terminal to discover multicast sessions by providing the user with a list of available multicast sessions and the cost associated with each session. Multicast session management 112 is responsible for establishing a multicast session, maintaining the session communication, and disconnecting the session when the communication is complete. Multicast security client 113 manages the security associated with receiving multicast data from a network connection. For example, multicast security client 113 periodically receives decryption key 118 for decrypting the multicast session data.

Referring again to FIG. 1B, last hop router 120 is the last routing entity through which IP data destined for user terminal 110 passes. Last hop router 120 comprises routing function 121, group membership management 122, multicast security unit 123, multicast charging unit 124, data volume meter 125, and charging database 126. Routing function 121 performs traditional network routing and provides support for the IP multicast protocol. Group membership management 122 maintains the group membership information for every terminal on the same multicast link and is responsible for determining the join status of each terminal. Multicast security unit 123 is responsible for sending decryption key 118 to user terminal 110. Optionally, multicast security unit 123 may encrypt the multicast data from multicast server 190 before it is sent to user terminal 110. Multicast security unit 123 sends decryption key 118 when the user initially joins a multicast session. Multicast security unit 123 updates decryption key 118 either when another multicast user terminates the session or at discrete time intervals. Multicast security unit 123 communicates decryption key 118 to multicast security client 113 either by a direct connection, via routing function 121, or via routing function 121 and group membership management 122. Multicast charging unit 124 maintains information related to multicast session charges for user terminal 110. Multicast charging unit 124 creates a charging entry in charging database 126 when user terminal 110 joins a multicast session. Multicast charging unit 124 updates the charging entry when user terminal 110 updates the join status or terminates the session. When user terminal 110 terminates the session, multicast charging unit 124 retrieves the relevant session charge information from charging database 126 and forwards the information to billing server 170. Data volume meter 125 measures, for a multicast session, the number of bytes or data volume transmitted to user terminal 110. Charging database 126 stores information related to multicast session charges. The implementation of charging database 126 contemplates a flat-file architecture, relational database management system design, object-oriented database design, or the equivalent.

Referring again to FIG. 1B, billing server 170 is a general-purpose server computer that includes a module to convert charging information such as connection time or data volume into billing data including the cost to receive the multicast session data. Billing server 170 comprises billing unit 171 and billing database 172. Billing unit 171 converts the information related to multicast session charges into billing information. Billing database 172 stores the billing information. The implementation of billing database 172 contemplates a flat-file architecture, relational database management system design, object-oriented database design, or the equivalent.

Figure 1C:
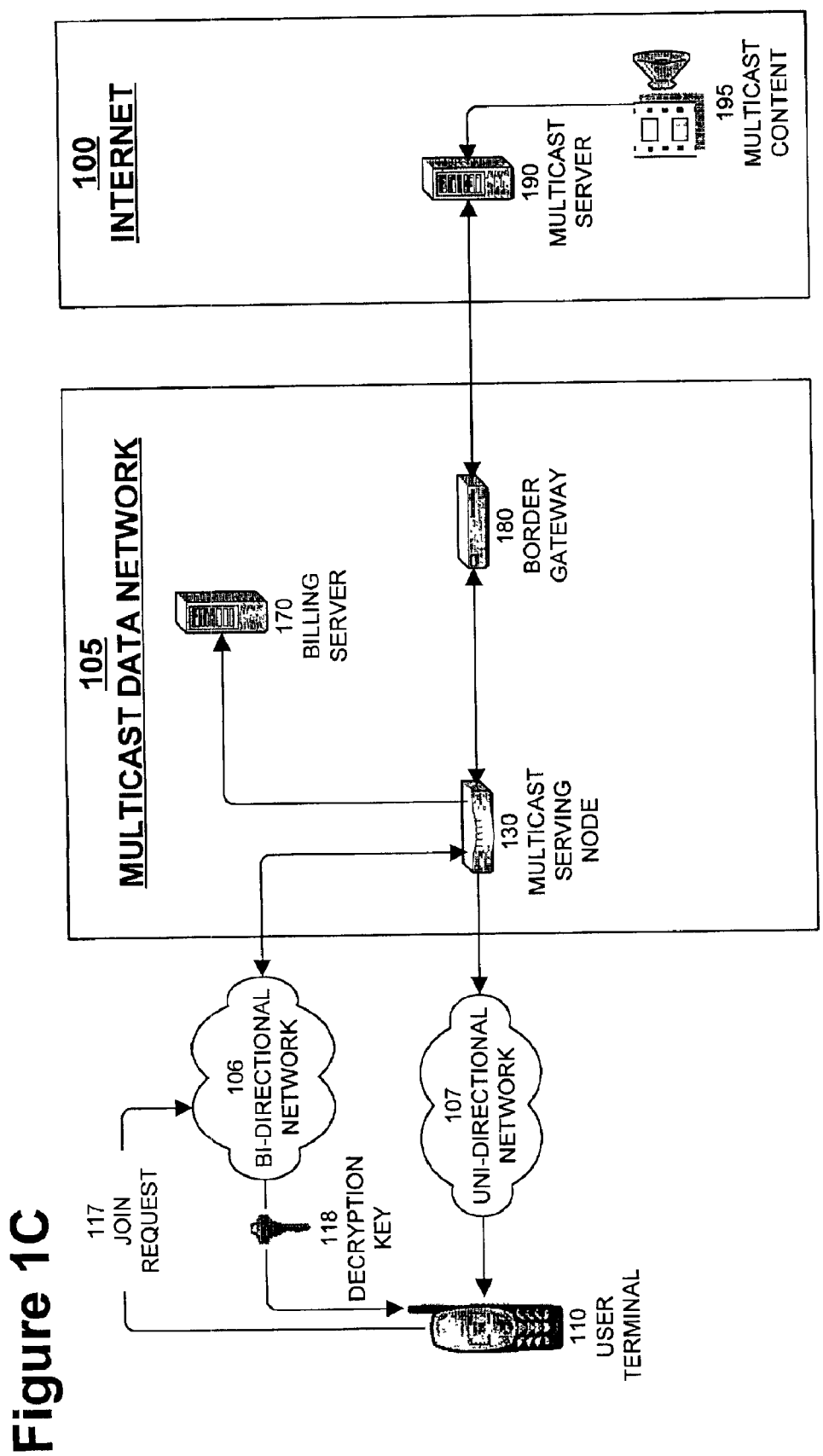
FIG. 1C is a network diagram illustrating an embodiment of the secure billing system shown in FIG. 1A that accommodates an indirect connection between user terminal 110 and multicast data network 105.

FIG. 1C is a network diagram illustrating an embodiment of the secure billing system shown in FIG. 1A that accommodates an indirect connection between user terminal 110 and multicast data network 105. Internet 100 and multicast data network 105 perform the same functions as described above in the discussion of FIG. 1A. Bi-directional network 106 is a data network such as a General Packet Radio Service (GPRS) network that supports uplink connectivity and provides an interface between user terminal 110 and multicast data network 105. Uni-directional network 107 is a data network such as a DVB terrestrial (DVB-T) network that transmits multicast data to entities such as user terminal 110. The invention disclosed herein contemplates network architectures comparable to bidirectional network 106 and unidirectional network 107 such as a cellular network, a satellite network, a DVB network, or a private network architecture.

As shown in FIG. 1C, user terminal 110 includes an interface module that connects a user to the secure billing system for multicast network services. In one embodiment, user terminal 110 is a mobile device such as a cellular telephone. User terminal 110 also includes a communication module to receive multicast data transmitted by multicast serving node 130. A user operates user terminal 110 to receive multicast content 195 by sending join request 117 to multicast serving node 130 via bi-directional network 106. After receiving join request 117, multicast serving node 130 attaches to the multicast tree using any existing multicast routing protocol. In one embodiment, multicast serving node 130 attaches to the multicast tree via border gateway 180. Multicast serving node 130 and border gateway 180 perform routing functions for multicast data network 105. Multicast serving node 130 forwards the multicast data from multicast data network 105 to user terminal 110 via either bi-directional network 106 or unidirectional network 107. Border gateway 180 is the routing entity that provides the interface between multicast data network 105 and an external network such as Internet 100. In response to join request 117, user terminal 110 receives decryption key 118 from multicast serving node 130 via bidirectional network 106. In one embodiment, multicast serving node 130 is responsible for sending decryption key 118 to user terminal 110 and encrypts the data sent by multicast server 190 prior to forwarding the data to user terminal 110. Multicast serving node 130 also forwards the multicast data comprising multicast content 195 to user terminal 110 via uni-directional network 107. In addition to data routing, multicast serving node 130 monitors multicast communication messages that user terminal 110 sends and receives, stores charging data related to a subscription request, and forwards the charging data to billing server 170, a general-purpose server computer. Billing server 170 converts the charging data into billing data, stores the billing data, and notifies the user of the total charge for subscribing to multicast content 195.

An example of the embodiment shown in FIG. 1C includes delivering IP data from an Internet Service Provider (ISP) network owned by operator A via a DVB terrestrial (DVB-T) network owned by operator B to the mobile terminal operated by a user. A service agreement between the user and operator A obligates the user to pay a fee for receiving multicast data that operator A delivers. Also, an agreement between operator A and operator B obligates operator A to pay a fee for sending data over the DVB-T network owned by operator B. To subscribe to a multicast session, the user sends join request 117 to multicast serving node 130 via the data network owned by operator C. Multicast serving node 130 delivers multicast session data to the mobile terminal via the DVB-T network owned by operator B, monitors multicast communication messages, stores charging data related to the subscription request, and forwards the charging data to billing server 170.

Figure 1D:
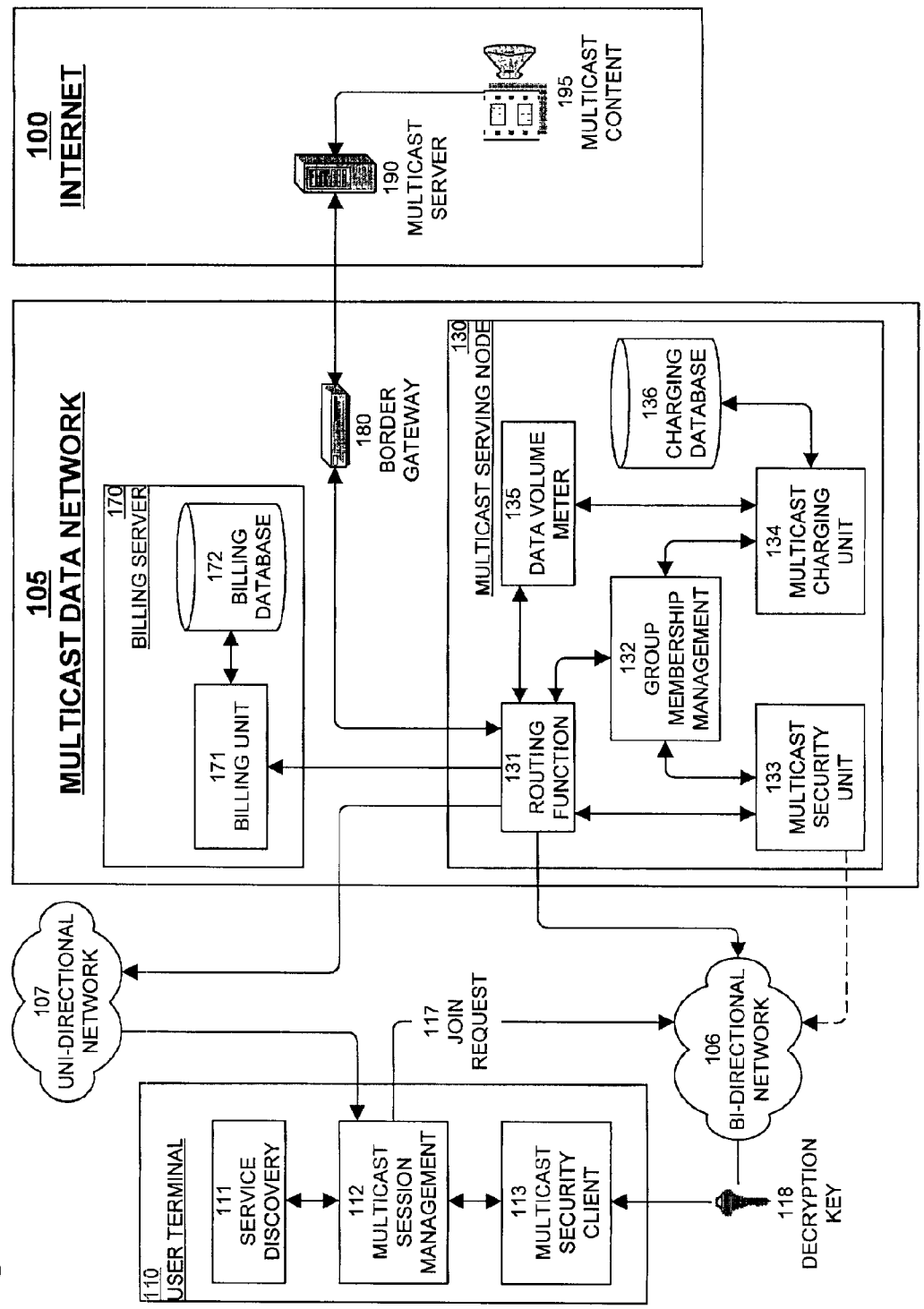
FIG. 1D is a network diagram that illustrates the components comprising the secure billing system shown in FIG. 1C.

FIG. 1D is a network diagram that illustrates the components comprising the secure billing system shown in FIG. 1C. Except for the differences described below, the function and structure of the components shown in FIG. 1D are identical to the components shown in FIG. 1B. In addition, routing function 131 functions similar to routing function 121, group membership management 132 functions similar to group membership management 122, multicast security unit 133 functions similar to multicast security unit 123, multicast charging unit 134 functions similar to multicast charging unit 124, data volume meter 135 functions similar to data volume meter 125, and charging database 136 functions similar to charging database 126. In FIG. 1D, routing function 131 and multicast security unit 133 do not communicate with user terminal 110 directly, but via either bi-directional network 106 or uni-directional network 107. Similarly, multicast session management 112 does not communicate to with multicast serving node 130 directly, but via bidirectional network 106.

Figure 1E:
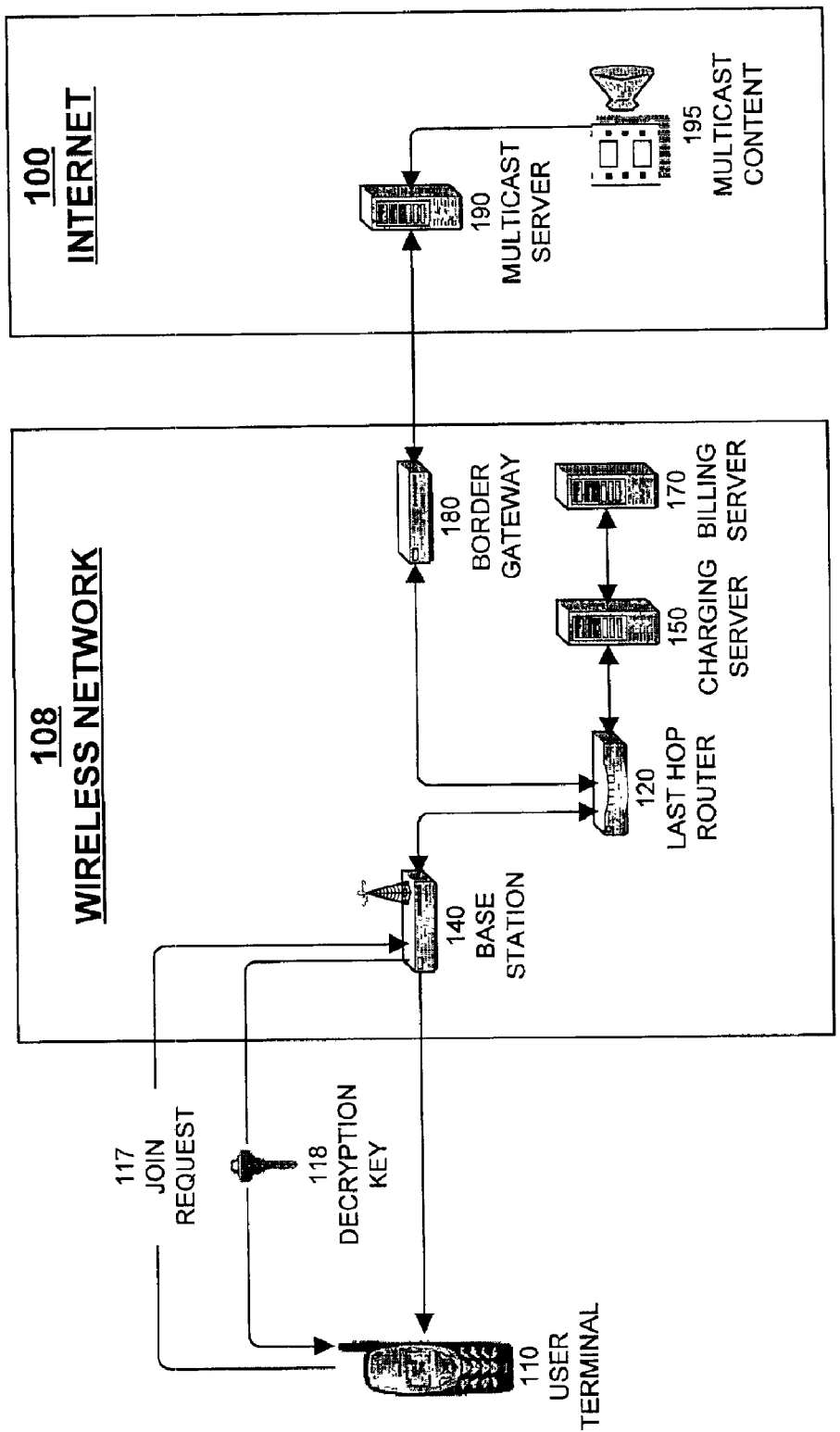
FIG. 1E is a network diagram illustrating an embodiment of the secure billing system shown in FIG. 1A that distributes the security function to base station 140 and the charging function to charging server 150.

FIG. 1E is a network diagram illustrating an embodiment of the secure billing system shown in FIG. 1A that distributes the security function to base station 140 and the charging function to charging server 150. As shown in FIG. 1E, user terminal 110 is a mobile device that communicates with wireless network 108 via base station 140. In one embodiment, base station 140 is the base station subsystem in a GPRS network. A user operates user terminal 110 to receive multicast content 195 by sending join request 117 to base station 140. After receiving join request 117, base station 140 attaches to the multicast tree using any existing multicast routing protocol. In one embodiment, base station 140 attaches to the multicast tree via last hop router 120 and border gateway 180. Last hop router 120 and border gateway 180 perform routing functions for wireless network 108. In response to join request 117, user terminal 110 receives decryption key 118 from base station 140. In one embodiment, base station 140 is responsible for sending decryption key 118 to user terminal 110 and encrypts the data sent by multicast server 190 prior to forwarding the data to user terminal 110. In addition to data routing, the connection between last hop router 120 and base station 140 allow last hop router 120 to monitor multicast communication messages that user terminal 110 sends to and receives from base station 140. Last hop router 120 also transfers charging data related to a subscription request to charging server 150. In one embodiment, charging server 150 stores the charging data and periodically forwards the data via a direct connection to billing server 170. In another embodiment, charging server 150 stores the charging data and periodically forwards the data to billing server 170 via a connection between last hop router 120 and billing server 170. Charging server 150 and billing server 170 are general-purpose server computers.

Figure 1F:
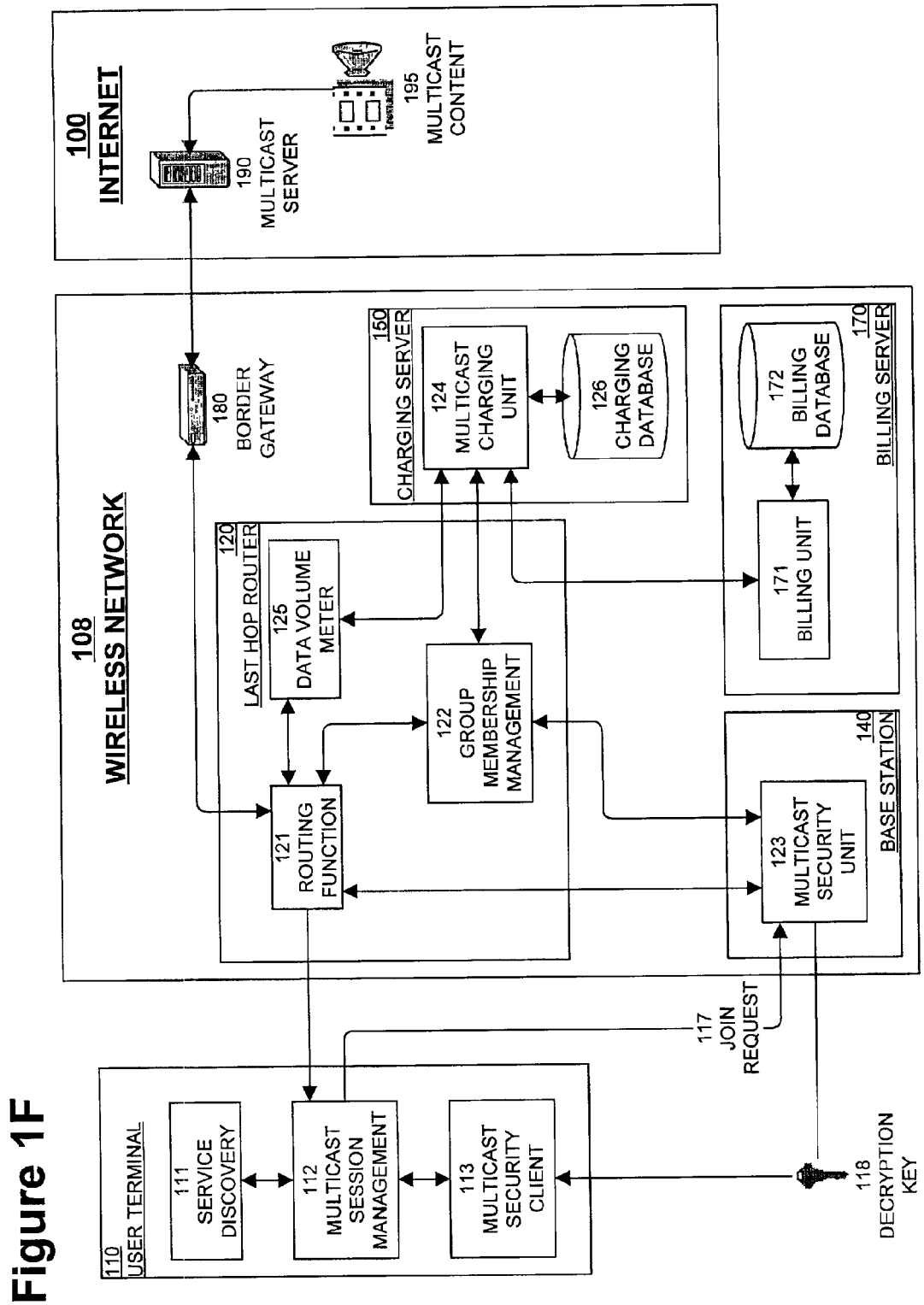
FIG. 1F is a network diagram that illustrates the components comprising the secure billing system shown in FIG. 1E.

FIG. 1F is a network diagram that illustrates the components comprising the secure billing system shown in FIG. 1E. Except for the differences described below, the function and structure of the components shown in FIG. 1F are identical to the components shown in FIG. 1B. FIG. 1F distributes the components of last hop router 120, as shown in FIG. 1B, among last hop router 120, base station 140, and charging server 150. Last hop router 120 comprises routing function 121, group membership management 122, and data volume meter 125. Base station 140 comprises multicast security unit 123, the communication interface between multicast security unit 123 and routing function 121, and the communication interface between multicast security unit 123 and group membership management 122. Charging server 150 comprises multicast charging unit 124, charging database 126, the communication interface between multicast charging unit 124 and group membership management 122, and the communication interface between multicast charging unit 124 and data volume meter 125. In one embodiment, billing server 170 comprises billing unit 171 and billing database 172 and charging server 150 further comprises a communication interface between charging unit 124 and billing unit 171.

Figure 1G:
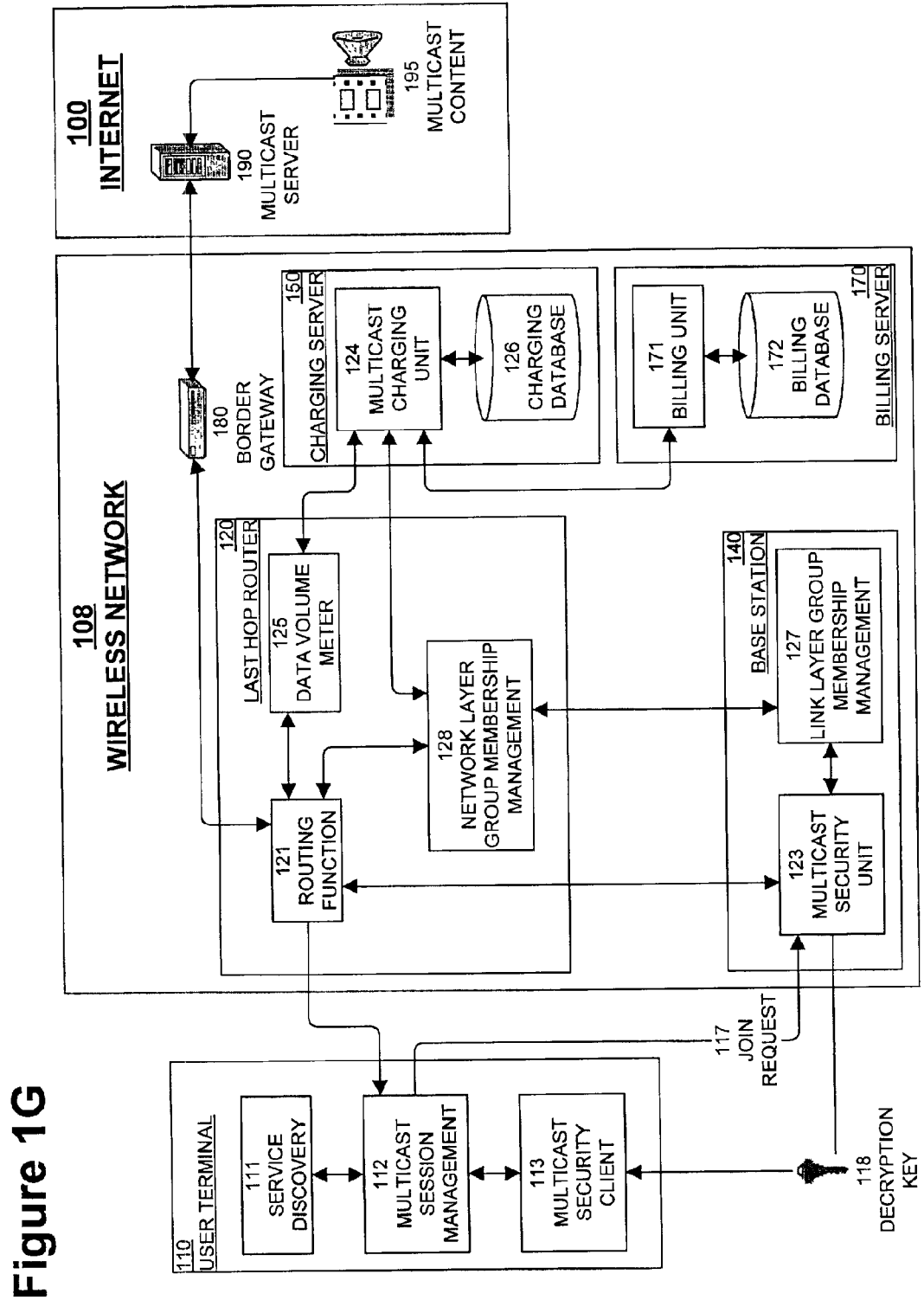
FIG. 1G is a network diagram that illustrates the components comprising the secure billing system shown in FIG. 1E.

FIG. 1G is a network diagram that illustrates the components comprising the secure billing system shown in FIG. 1E. Except for the differences described below, the function and structure of the components shown in FIG. 1G are identical to the components shown in FIG. 1F. FIG. 1G illustrates a distributed architecture for group membership management 122 shown in FIG. 1F. Last hop router 120, as shown in FIG. 1G, comprises routing function 121, data volume meter 125, and network layer group membership management 128. Base station 140, as shown in FIG. 1G, comprises multicast security unit 123, link layer group membership management 127, the communication interface between multicast security unit 123 and routing function 121, and the communication interface between link layer group membership management 127 and network layer group membership management 128. Charging server 150, as shown in FIG. 1G, comprises multicast charging unit 124, charging database 126, the communication interface between multicast charging unit 124 and network layer group membership management 128, and the communication interface between multicast charging unit 124 and data volume meter 125. Link layer group membership management 127 maintains the information of the join status of user terminal 110 within the cell and provides that information to multicast charging unit 124. Whenever there are any multicast receivers within the cell, link layer group membership management 127 informs network layer group membership management 128 to join in the multicast tree. Network layer group membership management 128 is responsible for keeping track of which base station needs multicast data and routes the multicast data to the appropriate base station.

Figure 2A:
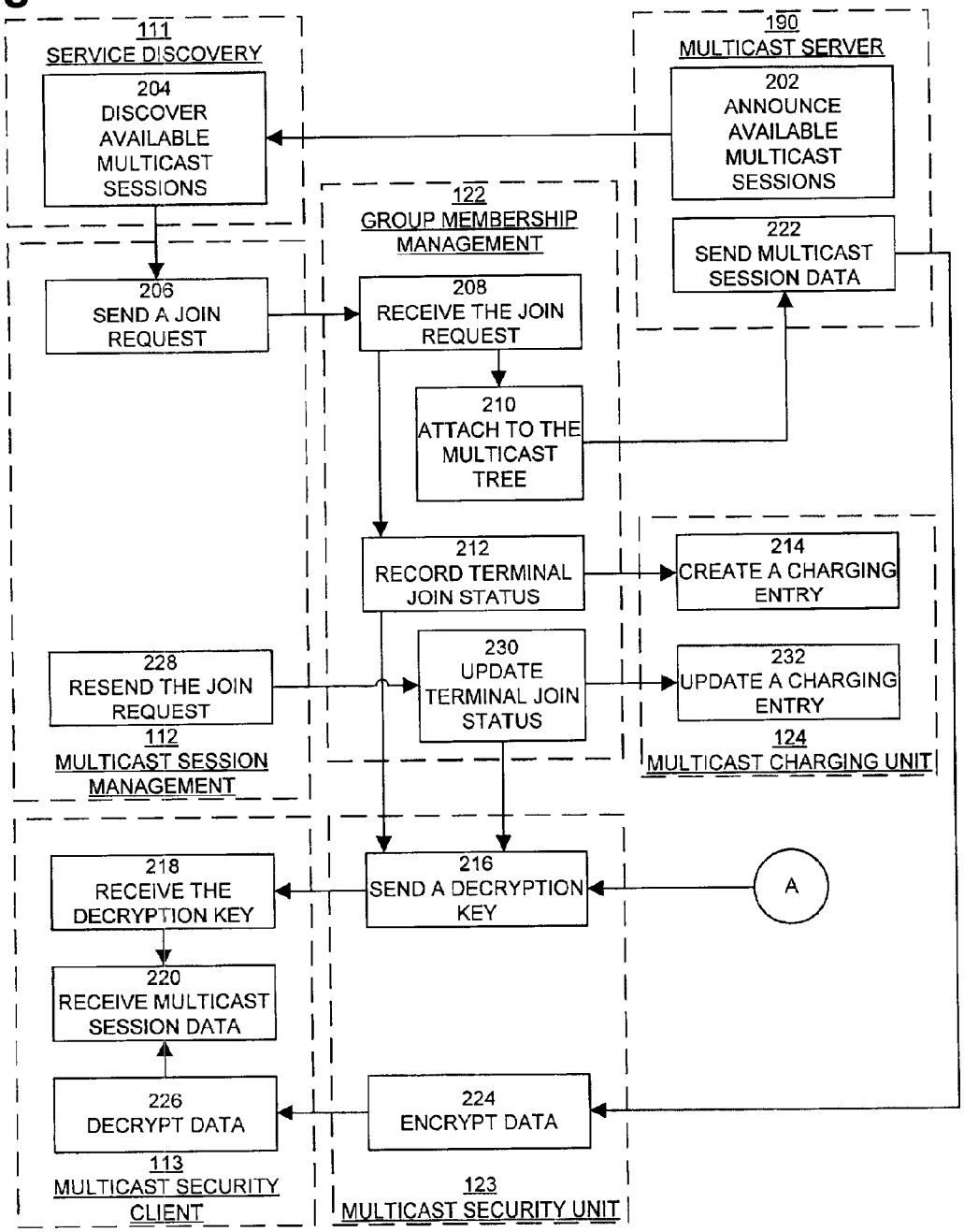
FIGS. 2A and 2B illustrate a method of operation for the secure billing system shown in FIG. 1B.
Figure 2B:
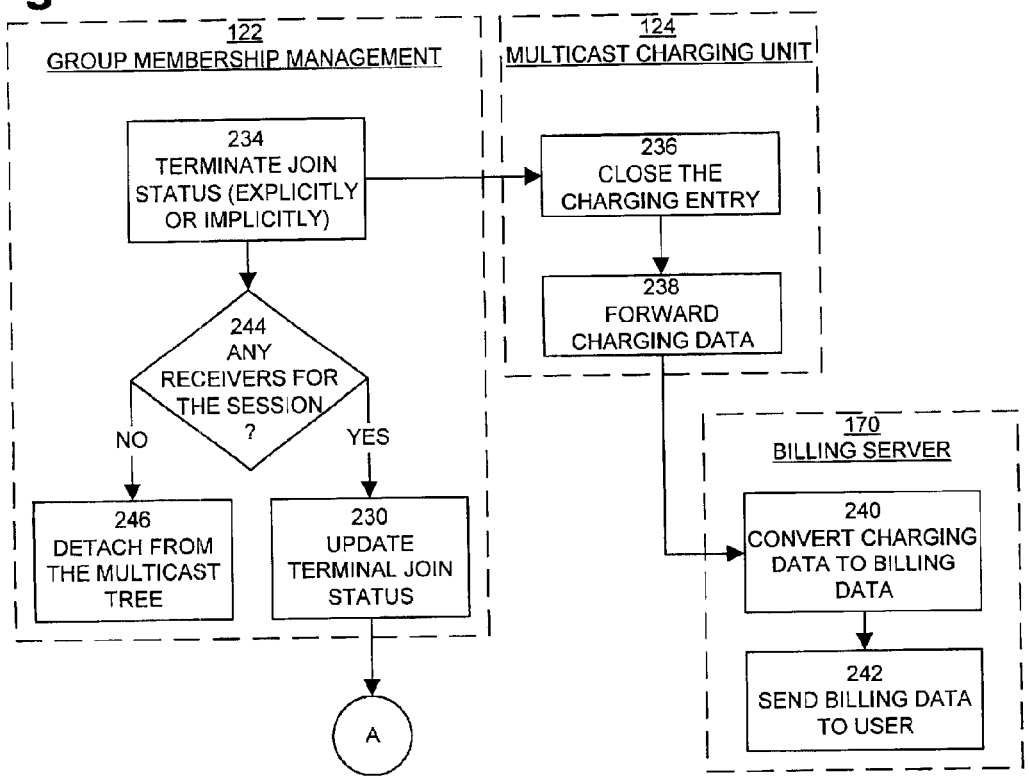

FIGS. 2A and 2B illustrate a method of operation for the secure billing system shown in FIGS. 1A and 1B. Referring to FIGS. 1A, 1B, and 2A, the method begins at step 202 with multicast server 190 announcing the available multicast sessions to user terminal 110 via multicast data network 105. At step 204, service discovery 111 discovers the multicast sessions that are available. Service discovery 111 provides an operator of user terminal 110 with a list of available multicast sessions and the relevant information for each session. The relevant information includes the starting time and cost associated with a multicast session. The operator selects a multicast session from the list. In response to the operator's selection, user terminal 110 activates the selected multicast session. In one embodiment, the activation of the multicast session occurs immediately. In another embodiment, the activation occurs at a predetermined time such as before the start of the multicast session. At step 206, multicast session management 112 sends join request 117 for the selected multicast session to group membership management 122. Group membership management 122 receives join request 117 at step 208 and records the join status of the user terminal at step 212. Group membership management 122 forwards the joined status information to multicast charging unit 124 and multicast security unit 123. Multicast charging unit 124 uses the joined status information to create a charging entry in charging database 126 at step 214. Multicast security unit 123 uses the joined status information to send a decryption key to user terminal 110 at step 216 which multicast security client 113 receives at step 218 before receiving multicast session data at step 220. In one embodiment, multicast security unit 123 encrypts the message prior to sending the decryption key and multicast security client 113 decrypts the message after receiving the decryption key. After receiving join request 117 at step 208, group membership management 122 also attaches to the multicast tree using any multicast routing protocol at step 210. In one embodiment, group membership management 122 applies authentication and authorization procedures before attaching to the multicast tree. At step 222, multicast server 190 sends multicast session data to multicast security unit 123. The multicast session data is encrypted by multicast security unit 123 at step 224 and decrypted by multicast security client 113 at step 226 before receiving multicast session data at step 220.

At step 228, FIG. 2A illustrates user terminal 110 updating the join status, for example, to extend the duration of the multicast session connection. Multicast session management 112 resends the join request to group membership management 122. Group membership management 122 updates the join status for user terminal 110 at step 230 and notifies multicast security unit 123 to send an updated decryption key at step 216. Multicast session management 112 is responsible for sending an updated join request to last hop router 120 on an on-going basis. As long as the user is receiving the session, multicast session management 113 must update the join status for the terminal before it expires. Whenever the join status is updated, group membership management 122 also forwards the status to multicast charging unit 124 to update the charging entry at step 232. After updating the join status for user terminal 110 at step 230, group membership management 122 notifies multicast charging unit 124 to update the charging entry in charging database 126 at step 232.

At step 234, FIG. 2B illustrates user terminal 110 terminating the multicast session, either explicitly or implicitly, by sending a disjoin request to last hop router 120. Group membership management 122 receives the disjoin request and, at step 236, notifies multicast charging unit 124 to close the charging entry for user terminal 110 in charging database 126.

Multicast charging unit 124 forwards the charging data to billing server 170 at step 238. Billing server 170 converts the charging data to billing data, at step 240, and sends the billing data to the user at step 242. If a data volume based charging mechanism is used, in order to generate and update the charging entry, data volume meter 125 forwards to multicast charging unit 124 the volume of data delivered to user terminal 110. At step 244, group membership management 122 determines whether any receivers of the multicast data have an active join status. If no receivers have an active join status, at step 246, group membership management 122 detaches user terminal 110 from the multicast tree. If there is at least one receiver with an active status, group membership management 122 proceeds to steps 230 and 216 where the terminal status is updated and multicast security unit 123 is notified to send an updated decryption key to multicast security client 113.

Figure 2C:
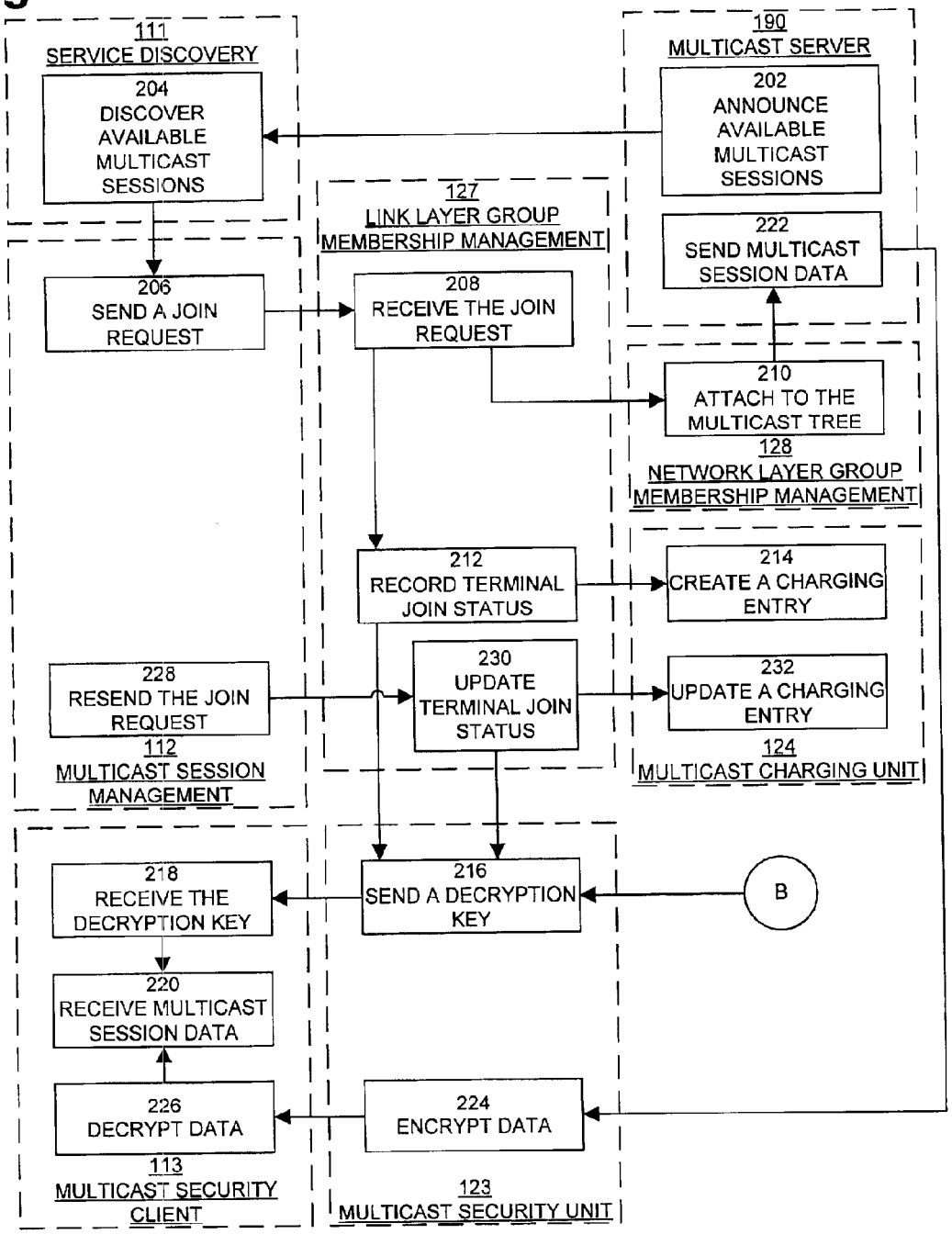
FIGS. 2C and 2D illustrate a method of operation for the secure billing system shown in FIG. 1G.
Figure 2D:
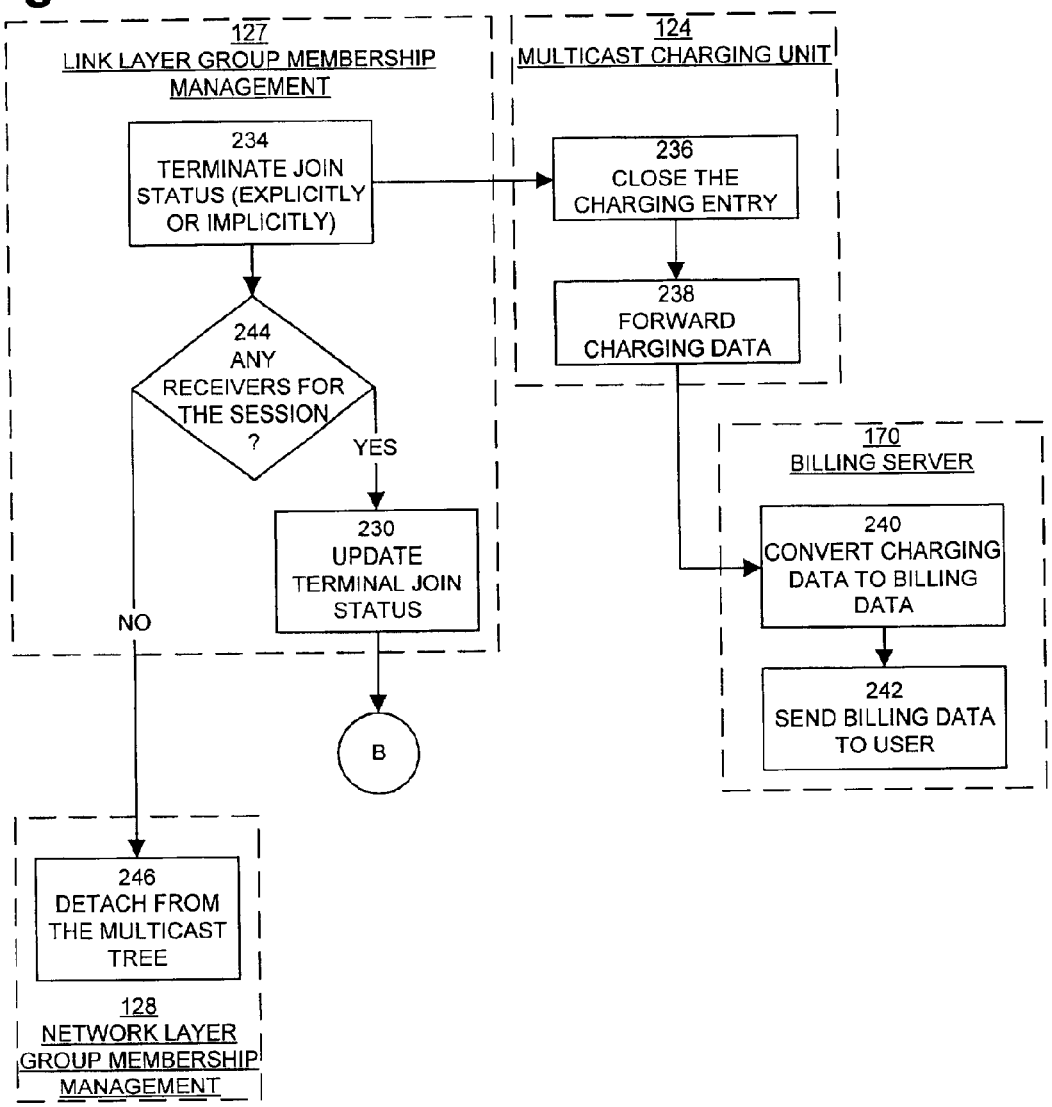

FIGS. 2C and 2D illustrate a method of operation for the secure billing system shown in FIGS. 1E and 1G. Referring to FIGS. 1E, 1G, and 2C, the method begins at step 202 with multicast server 190 announcing the available multicast sessions to user terminal 110 via wireless network 108. At step 204, service discovery 111 discovers the multicast sessions that are available. Service discovery 111 provides an operator of user terminal 110 with a list of available multicast sessions and the relevant information for each session. The relevant information includes the starting time and cost associated with a multicast session. The operator selects a multicast session from the list. In response to the operator's selection, user terminal 110 activates the selected multicast session. In one embodiment, the activation of the multicast session occurs immediately. In another embodiment, the activation occurs at a predetermined time such as before the start of the multicast session. At step 206, multicast session management 112 sends join request 117 for the selected multicast session to link layer group membership management 127. Link layer group membership management 127 receives join request 117 at step 208 and records the join status of the user terminal at step 212. Link layer group membership management 127 forwards the joined status information to multicast charging unit 124 and multicast security unit 123. Multicast charging unit 124 uses the joined status information to create a charging entry in charging database 126 at step 214. Multicast security unit 123 uses the joined status information to send a decryption key to user terminal 110 at step 216 which multicast security client 113 receives at step 218 before receiving multicast session data at step 220. In one embodiment, multicast security unit 123 encrypts the message prior to sending the decryption key and multicast security client 113 decrypts the message after receiving the decryption key. After receiving join request 117 at step 208, link layer group membership management 127 also notifies network layer group membership management 128 to attach to the multicast tree using any multicast routing protocol at step 210. In one embodiment, link layer group membership management 127 applies authentication and authorization procedures before attaching to the multicast tree. At step 222, multicast server 190 sends multicast session data to multicast security unit 123. The multicast session data is encrypted by multicast security unit 123 at step 224 and decrypted by multicast security client 113 at step 226 before receiving multicast session data at step 220.

At step 228, FIG. 2C illustrates user terminal 110 updating the join status, for example, to extend the duration of the multicast session connection. Multicast session management 112 resends the join request to link layer group membership management 127. Link layer group membership management 127 updates the join status for user terminal 110 at step 230 and notifies multicast security unit 123 to send an updated decryption key at step 216. Multicast session management 112 is responsible for sending an updated join request to last hop router 120 on an on-going basis. As long as the user is receiving the session, multicast session management 113 must update the join status for the terminal before it expires. Whenever the join status is updated, link layer group membership management 127 also forwards the status to multicast charging unit 124 to update the charging entry at step 232. After updating the join status for user terminal 110 at step 230, link layer group membership management 127 notifies multicast charging unit 124 to update the charging entry in charging database 126 at step 232.

At step 234, FIG. 2D illustrates user terminal 110 terminating the multicast session, either explicitly or implicitly, by sending a disjoin request to last hop router 120. Link layer group membership management 127 receives the disjoin request and, at step 236, notifies multicast charging unit 124 to close the charging entry for user terminal 110 in charging database 126. Multicast charging unit 124 forwards the charging data to billing server 170 at step 238. Billing server 170 converts the charging data to billing data, at step 240, and sends the billing data to the user at step 242. If a data volume based charging mechanism is used, in order to generate and update the charging entry, data volume meter 125 forwards to multicast charging unit 124 the volume of data delivered to user terminal 110. At step 244, link layer group membership management 127 determines whether any receivers of the multicast data have an active join status. If no receivers have an active join status, link layer group membership management 127 notifies network layer group membership management 128, at step 246, to detach user terminal 110 from the multicast tree. If there is at least one receiver with an active status, link layer group membership management 127 proceeds to steps 230 and 216 where the terminal status is updated and multicast security unit 123 is notified to send an updated decryption key to multicast security client 113.

Connection Time Charging

A charging scheme based on connection time calculates a fee for a service from the elapsed time that a user connects to the service. For example, if a network operator determines that the rate for using a video service is $5.00 per hour, a user connecting to the video service to view a movie for thirty-minutes accrues a fee of $2.50. In a multicast network, a charging scheme based on connection time is most beneficial when an average multicast session has a fixed bandwidth. Determination of the connection time involves storing the time that the user terminates the multicast session connection, storing the time that the user initiates the multicast session connection, and calculating the difference between these times. Since a multicast session is dynamic, the challenge is to determine when the initiation and termination of the connection occurs.

The packets that comprise a multicast session are encrypted. Thus, a user cannot receive the multicast session without explicitly requesting to join a multicast group and receiving a decryption key. Referring to FIG. 1B, service discovery 111 receives all the available multicast sessions from last hop router 120. When user terminal 110 selects and activates a multicast session, multicast session management 112 explicitly requests to join a multicast group by sending join request 117 to group membership management 122. In response, group membership management 122 notifies multicast charging unit 124 and multicast security unit 123 that user terminal 110 agrees to pay a fee based on the connection time to the multicast service. Multicast charging unit 124 creates a charging entry for user terminal 110 and multicast content 195. Multicast security client 113 receives decryption key 118 from multicast security unit 123 that will decrypt the multicast session packet data. Group membership management 122 receives every join request sent by a user of the multicast service associated with a multicast group. A validated or authenticated join request activates the "joined" status for the user who sent the join request. Multicast charging unit 124 creates and maintains an entry in charging database 126 for each validated join request. The entry in charging database 126 comprises user identification data, session identification data, a cumulative connection time, and an expiration time for the "joined" status.

The join request sent by the user identifies the requested multicast session, the requested start time for the charging, and the requested stop time for the charging. The join request obligates the user to pay the charges that accrue from the start time to the end time. When the user has "joined" status, the multicast network is responsible for updating the user's "decryption key" whenever host membership in the multicast group changes. For a discussion of several methods for delivery of the decryption key see "Secure Group Communication using Key Graphs", IEEE/ACM Transactions on Networking, February 2000.

The stop time specified in the join request is the initial stop time for the user's multicast session. The user can extend the stop time by sending a second join request to specify a later stop time. The stop time can only be extended if group membership management 122 receives the second join request prior to the initial stop time. If the second join request arrives after the first join status expires, the user will be disconnecting with the multicast session first as a result of the expired join status. When the second join request arrives, it will act as a new join request to connect user terminal 110 to the multicast session. Following the receipt of a second or subsequent join request, multicast charging unit 124 updates the entry for the user and multicast session in charging database 126 and notifies other group members of a membership change.

In one embodiment, the interval between the start time and the stop time in each join request can be determined based on the configuration set by either the user or network operator. In another embodiment, the interval between the start time and the stop time can be calculated according to an environmental characteristic including the velocity of the terminal, the strength of the reception signal, and the quality of the reception signal.

Termination of the multicast session can happen either explicitly or implicitly. Explicit termination of the multicast session occurs when the user sends a disjoin request that specifies a stop time earlier than the pending stop time. A disjoin request is only effective, however, if group membership management 122 receives the disjoin request prior to the pending stop time. Following receipt of a disjoin request, multicast charging unit 124 updates and closes the entry in charging database 126 and forwards the charging data to billing unit 171 for conversion into billing data and storage in billing database 172. If the forwarding of the charging data is successful, multicast charging unit 124 deletes the entry in charging database 126 and, if the second join request arrives after the first join status expires, multicast security unit 123 updates decryption key 118 for other group members of the same multicast session. Implicit termination of the multicast session occurs when the user's "joined" status expires before the user sends a subsequent join request to extend the stop time. An implicit termination may occur, for example, when the battery in the user's terminal loses power or some other reason that causes terminal to loose the network connection. Accounting for implicit termination of a multicast session ensures that an excessive charge does not accrue for the user.

When the user status changes state from "joined" to "disjoined", multicast charging unit 124 calculates the total connection time. The billing related information such as user identification data, session identification data, and connection time is transferred from multicast charging unit 124 to billing server 170. Then, billing unit 171 converts the charging data into billing data and stores the billing data in billing database 172. Alternatively, multicast charging unit 124 periodically transfers billing data to billing server 170.

Unrestricted Connection Time

Figure 3A:
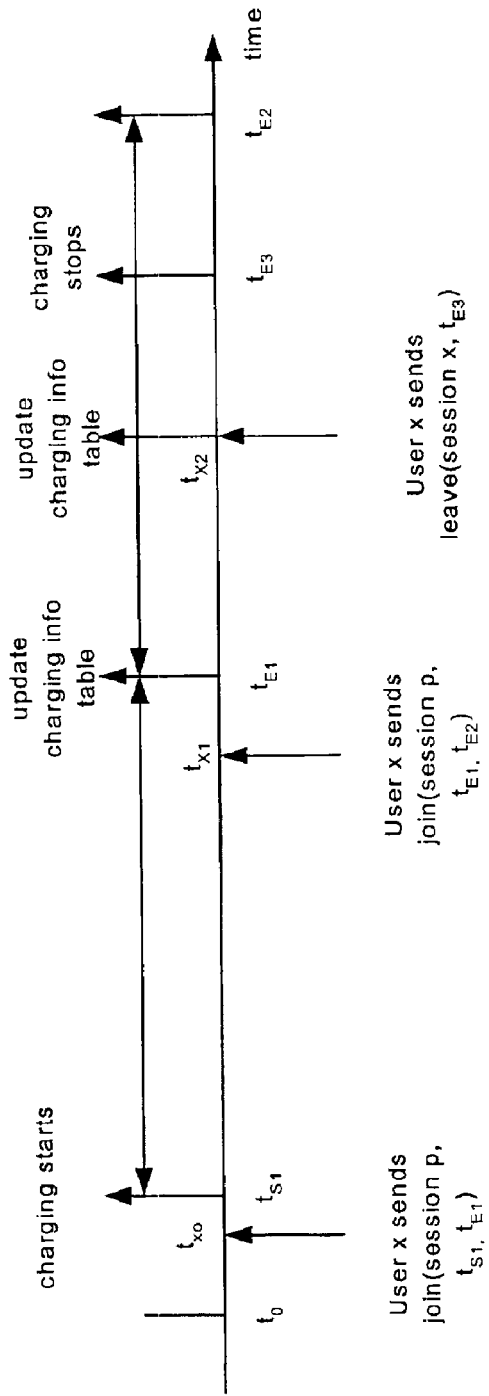
FIG. 3A is an exemplary timeline for a charging scheme based on connection time that illustrates an explicit disjoin.
Figure 3B:
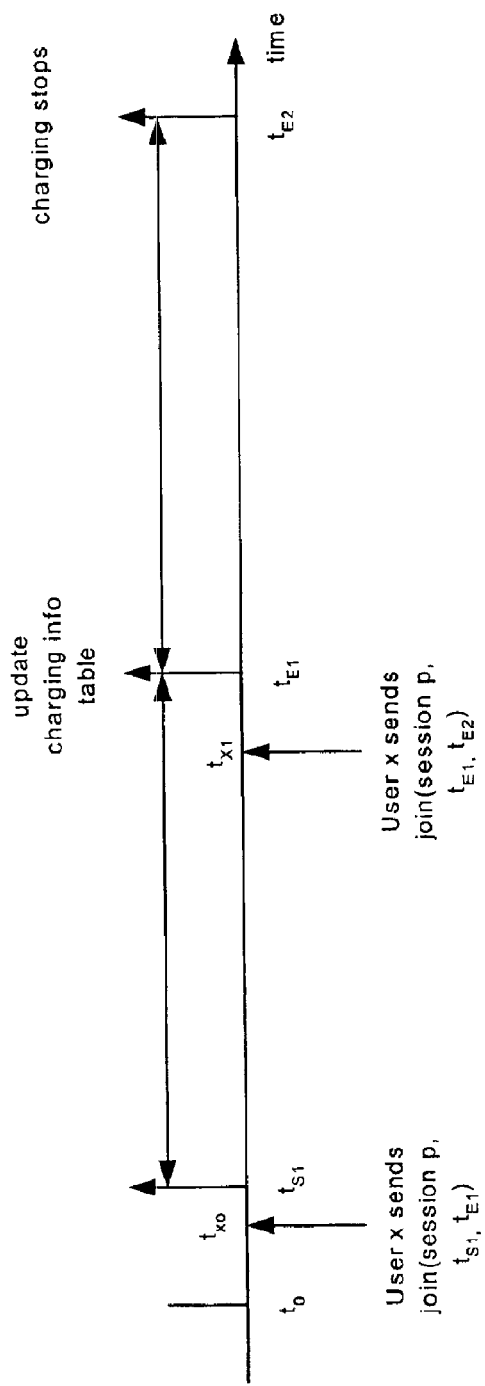
FIG. 3B is an exemplary timeline for a charging scheme based on connection time that illustrates an implicit disjoin.

FIGS. 3A and 3B are exemplary timelines for a charging scheme based on connection time that allows a user to join or leave a multicast session at any time. Referring to FIGS. 1B and 3A, if user terminal 110 explicitly requests termination of the multicast session connection, determination of the connection time comprises:

1. User terminal 110 sending a join request to group membership management 122 at time $t_{X0}$. If the join request takes the form join(p, $t_{S1, tE1}$), the user is requesting to join multicast session p, start the connection time charging at time $t_{S1}$, and end the connection time charging at time $t_{E1}$. If the user wants to start the connection time charging immediately, $t_{S1}$ is set equal to null.
2. Multicast security client 113 receiving decryption key 118 from multicast security unit 123 before time $t_{S1}$. Decryption key 118 functions to decrypt the packet data comprising multicast sessions.
3. At time $t_{S1}$, multicast charging unit 124 adds an entry to charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_{E1} - t_{S1})$ | $t_{E1}$ |

If the user sets $t_{S1}$ in the join request equal to null to indicate that the connection time charging will start immediately, $t_{X0}$ will replace $t_{S1}$ in the charging table because the join request was sent at time $t_{X0}$.

4. From time $t_{E1}$ until time $t_{E1}$, the multicast network is responsible for updating decryption key 118 for user terminal 110 whenever host membership in the multicast group changes.
5. At time $t_{X1}$, where $t_{X1} < t_{E1}$, user terminal 110 extends the stop time by sending a second join request to specify a later stop time. If the second join request takes the form join(p $t_{E1}$, $t_{E2}$), the user is requesting to extend the end time for the connection to multicast session p from time $t_{E1}$ to time $t_{E2}$.
6. At time $t_{E1}$, multicast charging unit 124 updates the entry in charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_{E1} - t_{S1})$ + $(t_{E2} - t_{E1})$ | $t_{E2}$ |

7. From time $t_{E1}$ until time $t_{E2}$, the multicast network is responsible for updating the "decryption key" for user terminal 110 whenever host membership in the multicast group changes.
8. At time $t_{X2}$, where $t_{X2} < t_{E2}$, user terminal 110 sends a disjoin request that specifies a stop time earlier than the pending stop time, $t_{E2}$. If the disjoin request takes the form leave(p, $t_{E3}$), user terminal 110 is requesting to leave multicast session p at time $t_{E3}$. If user terminal 110 wants to leave multicast session p immediately, $t_{E3}$ is set equal to null. Multicast charging unit 124 updates the entry in charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_{E1} - t_{S1})$ + $(t_{E2} - t_{E1})$ + $(t_{E3} - t_{E2})$ | $t_{E3}$ |

If the user sets $t_{E3}$ in the disjoin request equal to null to indicate that user terminal 110 wants to leave multicast session p immediately, $t_{X2}$ will replace $t_{E3}$ in the charging table because the join request was sent at time $t_{X2}$.

9. At time $t_{E3}$, collection of connection time charges for user terminal 110 stops. The multicast network is responsible for updating the "decryption key" for the other group members because user terminal 110 disjoined the multicast group. Since the collection of connection time charges has stopped, multicast charging unit 124 closes the entry in charging database 126 for user terminal 110 using multicast session p, communicates the charging data to billing unit 171 for storage in billing database 172, and deletes the entry in charging database 126.

Referring to FIGS. 1B and 3B, if termination of the multicast session connection is implied from the passage of time, steps 1 through 7 are identical to steps 1 through 7 from the discussion of FIG. 3A and determination of the connection time comprises:

1. User terminal 110 sending a join request to group membership management 122 at time $t_{X0}$. If the join request takes the form join(p, $t_{S1}$, $t_{E1}$), the user is requesting to join multicast session p, start the connection time charging at time $t_{S1}$, and end the connection time charging at time $t_{E1}$. If the user wants to start the connection time charging immediately, $t_{S1}$ is set equal to null.
2. Multicast security client 113 receiving decryption key 118 from multicast security unit 123 before time $t_{S1}$. Decryption key 118 functions to decrypt the packet data comprising multicast session p.
3. At time $t_{S1}$, multicast charging unit 124 adds an entry to charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_{E1} - t_{S1})$ | $t_{E1}$ |

If the user sets $t_{S1}$ in the join request equal to null to indicate that the connection time charging will start immediately, $t_{X0}$ will replace $t_{S1}$ in the charging table because the join request was sent at time $t_{X0}$.

4. From time $t_{S1}$ until time $t_{E1}$, the multicast network is responsible for updating decryption key 118 for user terminal 110 whenever host membership in the multicast group changes.
5. At time $t_{X1}$, where $t_{X1} < t_{E1}$, user terminal 110 extends the stop time by sending a second join request to specify a later stop time. If the second join request takes the form join(p, $t_{E1}$, $t_{E2}$), the user is requesting to extend the end time for the connection to multicast session p from time $t_{E1}$ to time $t_{E1}$.
6. At time $t_{E1}$, multicast charging unit 124 updates the entry in charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_{E1} - t_{S1})$ + $(t_{E2} - t_{E1})$ | $t_{E2}$ |

7. From time $t_{E1}$ until time $t_{E2}$, the multicast network is responsible for updating the "decryption key" for user terminal 110 whenever host membership in the multicast group changes.

8. At time $t_{E2}$, the connection time charging for user terminal 110 expires. Multicast charging unit 124 stops updating the entry for user terminal 110 using multicast session p in charging database 126. Multicast charging unit 124 communicates with billing server 170 to transfer the charging data for user terminal 110 using multicast session p from charging database 126 to billing database 172. Billing unit 171 converts the connection time, data volume, or other form of information for user terminal 110 using multicast session p to the entry of billing database 172, which has information of total cost of multicast session for user terminal 110. Alternatively, the entry in charging database 126 is transferred periodically to billing server 170. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_{E1} - t_{S1}) +$ $(t_{E2} - t_{E1})$ | $t_{E2}$ |

HANDOVER

The following examples describe how the system performs charging when a handover occurs from node A to node B. In the first example, the system configuration is as shown in FIG. 1B and the handover is from one last hop router to another. User terminal 110 needs to send a new join request to node B and a disjoin request to node A. Alternatively, node B can inform node A of the handover and disjoin user terminal 110 from node A. All of the components in node A (group membership management 122, multicast charging unit 124, multicast security unit 124, etc.) will follow the disjoin procedure as described herein. All of the components in node B (group membership management 122, multicast charging unit 124, multicast security unit 124, etc.) will follow the join procedure as described herein.

In the second example, the system configuration is as shown in FIG. 1B and nodes A and B are equipped with independent group membership management components or link layer group membership management components, but share the same multicast charging unit or charging server. User terminal 110 joins the multicast session from node A and later performs a handover from node A to node B. Since node A and node B are both equipped with group membership management or link layer group membership management components, the nodes support charging in a handover situation if a column is added to the charging entry to identify which node is responsible for the charging entry. When node A, in response to a join request, instructs multicast charging unit 124 to create a charging entry for user terminal 110, the ID of node A (e.g., the IP address of node A) is recorded in the charging entry as the "node responsible for this charging entry". When user terminal 110 performs a handover from node A to node B, user terminal 110 sends a join request to node B. As a result, node B sends a request for creating charging entry to multicast charging unit 124 that is shared by node A and node B. Upon receiving such a request, multicast charging unit 124 updates the relevant entry by changing the "node responsible for this charging entry" to node B and updating the "joined status expire time" to the new one indicated in the new join request. In addition, multicast charging unit 124 informs node A that node A is no longer responsible for the charging entry associated with user terminal 110. Node a may perform the disjoin procedure described herein to disjoin user terminal 110 from node A.

For example, before handover, user terminal 110 receives multicast data via node A. The charging entry is:

| User Identification | Session Identification | Node Responsible for this Entry | Connection Time | Expiration Time of "Joined" Status |
|---|---|---|---|---|
| 21323421 | finnkino 457286529 1453 172.10.20.212 | ID of node A | $(t_{E1} - t_{S1}) +$ $(t_{E2} - t_{E1}) +$ $(t_{E3} - t_{E2})$ | $t_{E3}$ |

Then user terminal 110 begins to perform the handover. At time $t_{H1}$, where $t_{X2} < t_{E3}$, node B with group membership management component receives the join request join(p, null, $t_{E4}$) from user terminal 110. Node B informs multicast charging unit 124 to create a charging entry for user terminal 110. In response, multicast charging unit 124 modifies the existing charging entry in the following manner.

| User Identification | Session Identification | Node Responsible for this Entry | Connection Time | Expiration Time of "Joined" Status |
|---|---|---|---|---|
| 21323421 | finnkino 457286529 1453 172.10.20.212 | ID of node B | $(t_{E1} - t_{S1}) +$ $(t_{E2} - t_{E1}) +$ $(t_{E4} - t_{E2})$ | $t_{E4}$ |

Also, multicast charging unit 124 will inform node A that node A is no longer responsible for the charging entry associated with user terminal 110. Node A may perform disjoin procedures to disjoin user terminal 110 from node A.

Slotted Connection Time

Figure 3C:
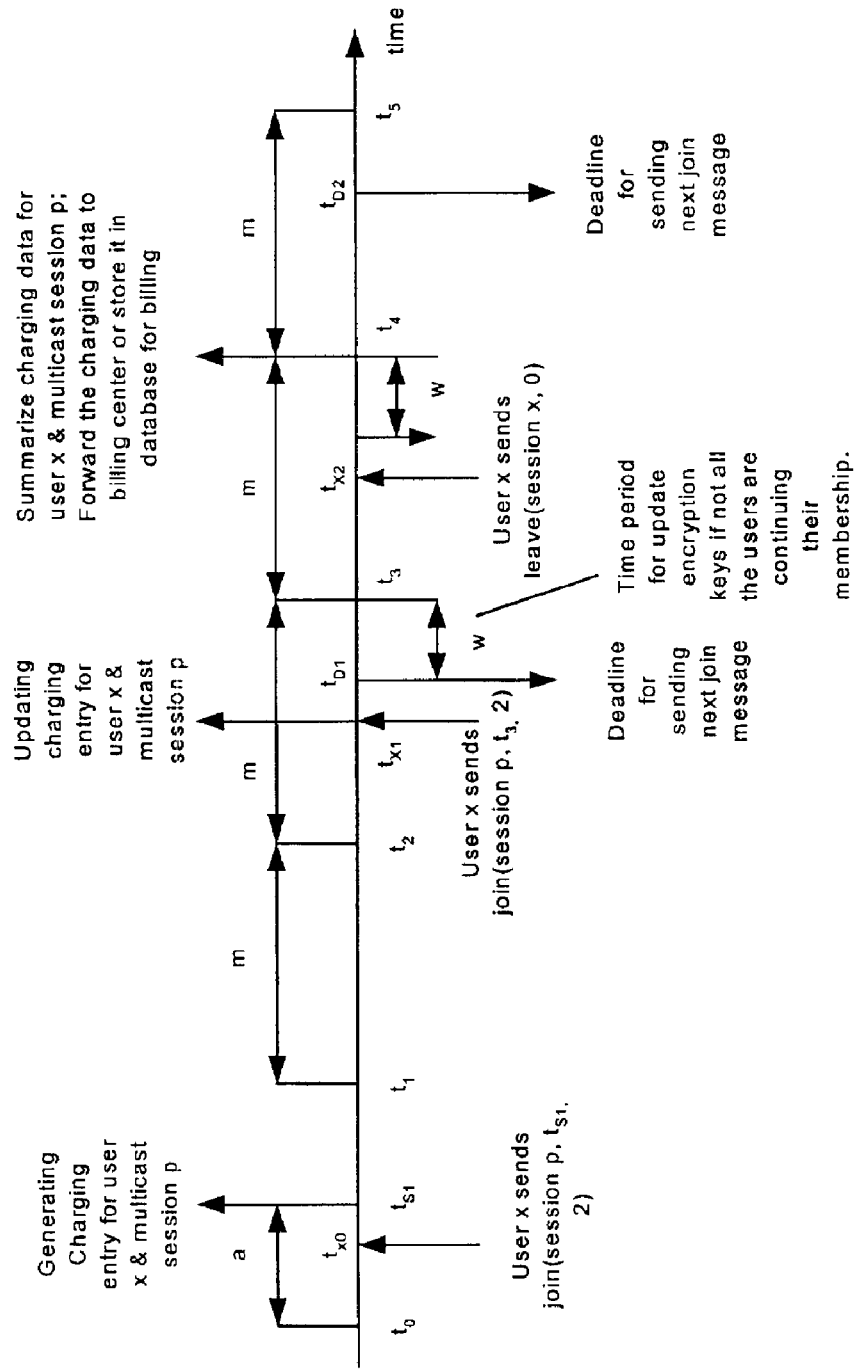
FIG. 3C is an exemplary timeline for a charging scheme based on slotted connection time that illustrates an explicit disjoin.
Figure 3D:
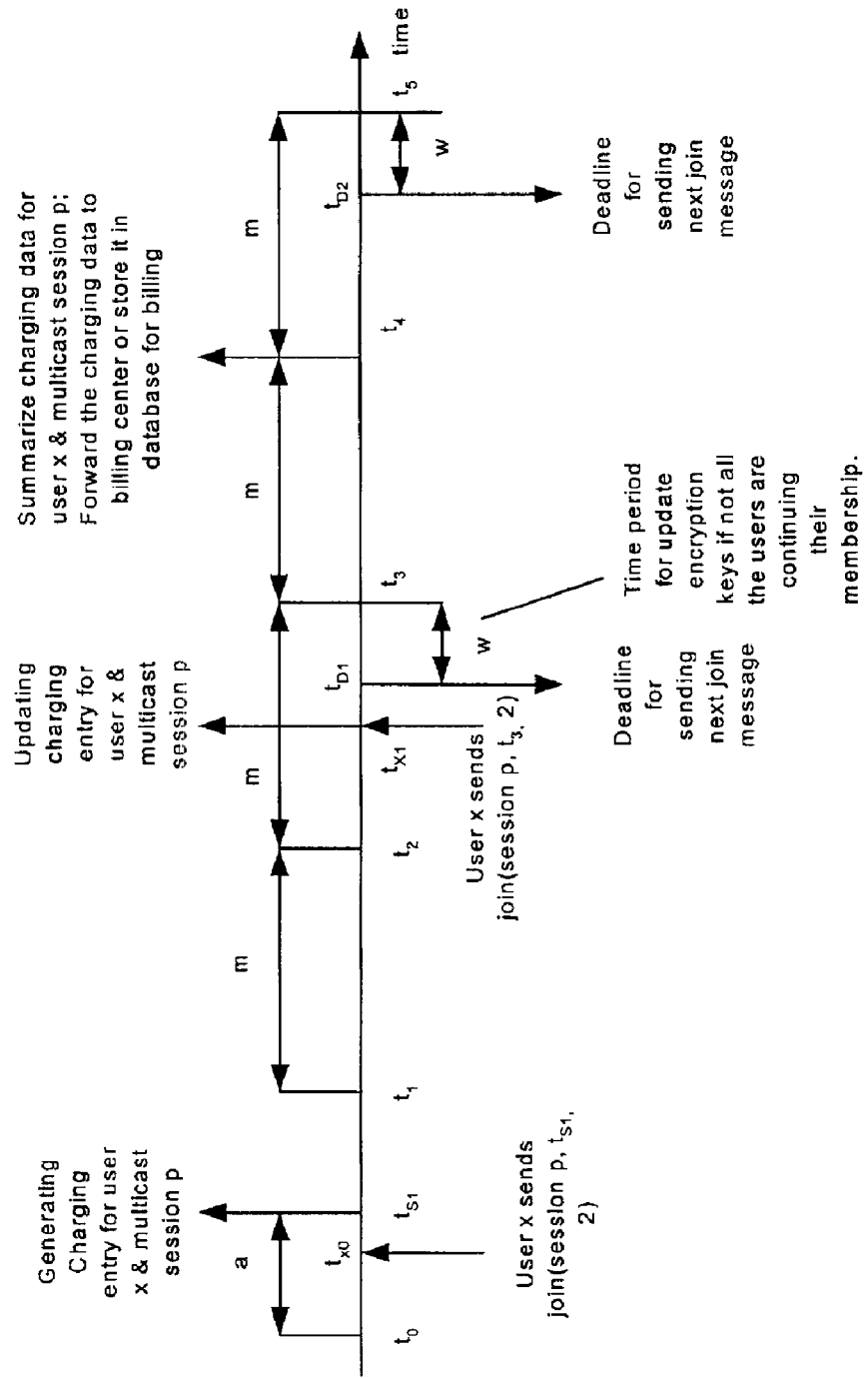
FIG. 3D is an exemplary timeline for a charging scheme based on slotted connection time that illustrates an implicit disjoin.

FIGS. 3C and 3D are exemplary timelines for a charging scheme based on connection time that only allows a user to join or leave a multicast session at the end of a discrete point in time or time slot. Since the user can only join or leave the multicast session at slotted time intervals (i.e., discrete points in time), the network only needs to update to the decryption key at those discrete points in time. Thus, the network can synchronize the disjoin activity of multiple users and reduce the number of decryption keys delivered. Referring to FIGS. 1B and 3C, if user terminal 110 explicitly requests termination of the multicast session connection, determination of the connection time comprises:

1. User terminal 110 sending a join request to group membership management 122 at time $t_{X0}$. If the join request takes the form join(p, $t_{S1}$, 2), the user is requesting to join multicast session p, start the connection time charging at time $t_{S1}$, and pay for the service from the start time until time $t_3 = [(t_0 + m - t_{S1}) + (2 \times m)]$ where m is the duration of a time slot and $t_0$ is the start of a time slot.

2. Multicast security client 113 receiving decryption key 118 from multicast security unit 123 before time $t_{S1}$. The multicast network informs user terminal 110 that time $t_{D1}$ is the deadline for extending the expiration of the connection to multicast session p. The offset w is defined by the network and represents the time interval between the deadline for receiving another join request and the end of a time slot.

3. At time $t_{S1}$, multicast charging unit 124 adds an entry to charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $[(t_0 + m - t_{S1}) + (2 \times m)]$ | $t_3$ |

4. From time $t_{S1}$ until time $t_3$, the multicast network is responsible for updating decryption key 118 for user terminal 110 whenever host membership in the multicast group changes. The updates to decryption key 118 occur during the offset interval w for each time slot. During the offset interval w, if the network determines that the status for a user will change from "joined" to "disjoined", the network updates decryption key 118.

5. At time $t_{X1}$, where $t_{X1} < t_{D1}$, user terminal 110 extends the stop time by sending a second join request to specify a later stop time. If the second join request takes the form join(p, $t_3$, 2), the user is requesting to extend the end time for the connection to multicast session p for 2 time slots after time $t_3$. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $[(t_0 + m - t_{S1}) + (2 \times m) + (2 \times m)]$ | $t_5$ |

The multicast network informs user terminal 110 that time $t_{D2}$ is the deadline for extending the expiration of the connection to multicast session p.

6. From time $t_3$ to time $t_5$, the multicast network is responsible for updating decryption key 118 for user terminal 110 whenever host membership in the multicast group changes.

7. At time $t_{X2}$, where $t_{X2} < t_{D2}$, user terminal 110 sends a disjoin request that specifies to stop accruing a fee when the current time slot expires. If the disjoin request takes the form leave(p, 0), user terminal 110 is requesting to leave session p when the current time slot expires. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_0 + m - t_{S1}) + (2 \times m) + (2 \times m) - (t_5 - t_4)$ | $t_4$ |

8. After time ($t_4 - w$), if the network determines that the status for a user will change from "joined" to "disjoined", the network updates decryption key 118 and continues the multicast session for the user into the next time slot.

9. At time $t_4$, collection of connection time charges for user terminal 110 stops. The multicast network is responsible for updating the "decryption key" for the other group members because user terminal 110 disjoined the multicast group. Since the collection of connection time charges has stopped, multicast charging unit 124 closes the entry in charging database 126 for user terminal 110 using multicast session p, communicates the charging data to billing unit 171 for storage in billing database 172, and deletes the entry in charging database 126.

Referring to FIGS. 1B and 3D, if termination of the multicast session connection is implied from the passage of time, steps 1 through 6 are identical to steps 1 through 6 from the discussion of FIG. 3C and determination of the connection time comprises:

1. User terminal 110 sending a join request to group membership management 122 at time $t_{X0}$. If the join request takes the form join(p, $t_{S1}$, 2), the user is requesting to join multicast session p, start the connection time charging at time $t_{S1}$, and pay for the service from the start time until time $t_3 = [(t_0 + m - t_{S1}) + (2 \times m)]$ where m is the duration of a time slot and $t_0$ is the start of a time slot.

2. Multicast security client 113 receiving decryption key 118 from multicast security unit 123 before time $t_{S1}$. The multicast network informs user terminal 110 th at time $t_{D1}$ is the deadline for extending the expiration of the connection to multicast session p. The offset w is defined by the network and represents the time interval between the deadline for receiving another join request and the end of a time slot.

3. At time $t_{S1}$, multicast charging unit 124 adds an entry to charging database 126 to track connection time charges for user terminal 110 using multicast session p. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $[(t_0 + m - t_{S1}) + (2 \times m)]$ | $t_3$ |

4. From time $t_{S1}$, until time $t_3$, the multicast network is responsible for updating decryption key 118 for user terminal 110 whenever host membership in the multicast group changes. The updates to decryption key 118 occur during the offset interval w for each time slot. During the offset interval w, if the network determines that the status for a user will change from "joined" to "disjoined", the network updates decryption key 118.

5. At time $t_{X1}$, where $t_{X1} < t_{D1}$, user terminal 110 extends the stop time by sending a second join request to specify a later stop time. If the second join request takes the form join(p, $t_3$, 2), the user is requesting to extend the end time for the connection to multicast session p for 2 time slots after time $t_3$. In one embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $[(t_0 + m - t_{S1}) + (2 \times m) + (2 \times m)]$ | $t_5$ |

The multicast network informs user terminal 110 that time $t_{D2}$ is the deadline for extending the expiration of the connection to multicast session p.

6. From time $t_3$ to time $t_5$, the multicast network is responsible for updating decryption key 118 for user terminal 110 whenever host membership in the multicast group changes.
7. After time $t_{D2}$, if the network determines that the status for a user will change from "joined" to "disjoined", the network updates decryption key 118 and continues the multicast session for the user into the next time slot.
8. At time $t_5$, collection of connection time charges for user terminal 110 stops. The multicast network is responsible for updating the "decryption key" for the other group members because user terminal 110 disjoined the multicast group. Since the collection of connection time charges has stopped, multicast charging unit 124 closes the entry in charging database 126 for user terminal 110 using multicast session p, communicates the charging data to billing unit 171 for storage in billing database 172, and deletes the entry in charging database 126. Alternatively, multicast charging unit 124 transfers the entry directly to billing server 170. In another embodiment, the entry to charging database 126 appears as follows:

| User Identification | Session Identification | Connection Time | Expiration Time of "Joined" Status |
|---|---|---|---|
| 21323421 | finnkino 457286529 1453 172.10.20.212 | $(t_0 + m - t_{S1}) + (2 \times m) + (2 \times m)$ | $t_5$ |

Data Volume Based Charging

A charging scheme based on the volume of data calculates a fee for a service from the volume of data that a user receives from the service. For example, if a network operator determines that the rate for using a video service is $0.25 for each Megabyte of data received, a user connecting to the video service to view a movie consisting of 25 Megabytes of data accrues a fee of $6.25. In a multicast network, a charging scheme based on the volume of data is most beneficial when the data rate varies. Similar to the charging scheme based on connection time discussed above, the connectivity and security is managed on time basis, however, determination of charge requires accounting for the number of bytes transferred during the connection time.

Figure 4A:
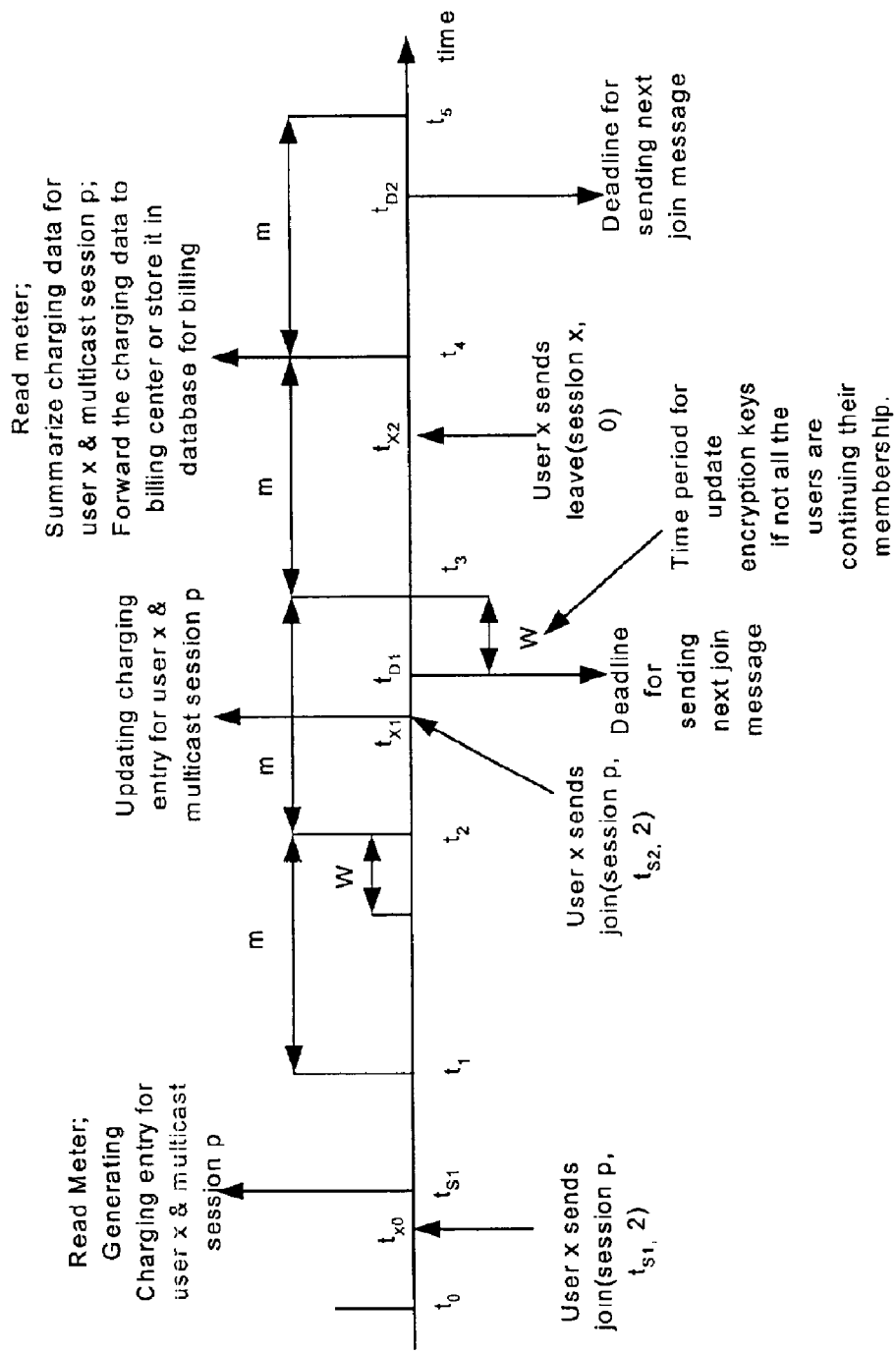
FIG. 4A is an exemplary timeline for a charging scheme based on data volume that illustrates an explicit disjoin.
Figure 4B:
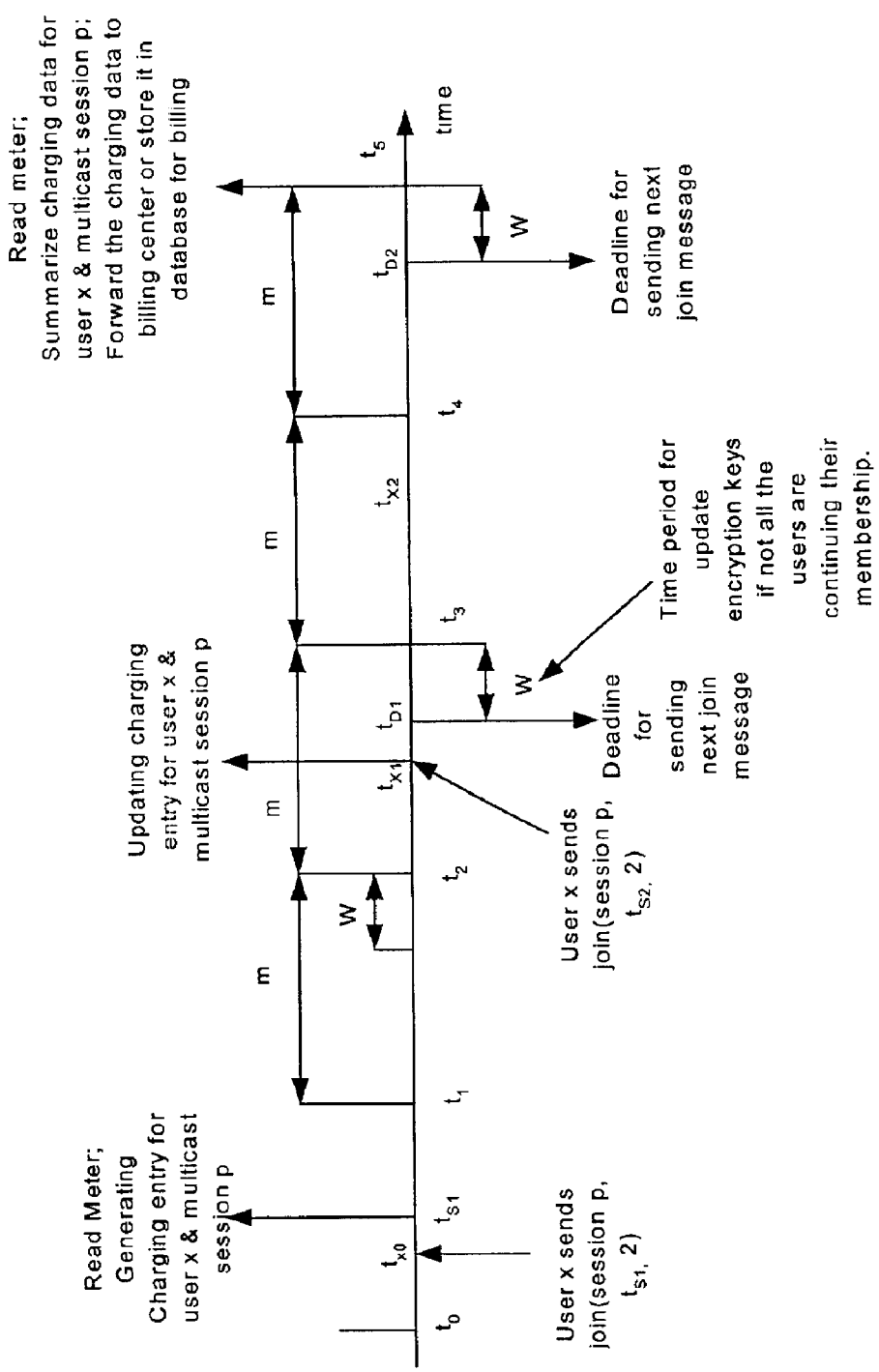
FIG. 4B is an exemplary timeline for a charging scheme based on data volume that illustrates an implicit disjoin.

FIGS. 4A and 4B are exemplary timelines for a charging scheme based on data volume that only allows a user to join or leave a multicast session at the end of a discrete point in time or time slot. Referring to FIGS. 1B and 4A, if user terminal 110 explicitly requests termination of the multicast session connection, determination of the data volume comprises:
1. Data volume meter 125 examining IP multicast data packets and maintaining a tally of the number of bytes of data received, for a given destination address and multicast session. Data volume meter 125 can either be co-located with multicast charging unit 124 or located on an upper layer of the multicast tree (e.g., on the gateway router where the multicast data enters the multicast network). In one embodiment, each last hop router may include a meter for measuring the multicast session routed to the last hop router. In another embodiment, the meter can be distributed across several access routers in the multicast network.
2. User terminal 110 sending a join request to group membership management 122 at time $t_{X0}$. If the join request takes the form join(p, $t_{S1}$, 2), the user is requesting to join multicast session p, start the connection time charging at time $t_{S1}$, and pay for the service from the start time until time $t_3=[(t_0+m-t_{S1})+(2\times m)]$ where m is the duration of a time slot and $t_0$ is the start of a time slot. Calculation of the fee depends on the volume of data received by a given destination and multicast session between time $t_{S1}$ and $t_3$.
3. Multicast security client 113 receiving decryption key 118 from multicast security unit 123 before time $t_{S1}$. The multicast network informs user terminal 110 that time $t_{D1}$ is the deadline for sending another join request. The offset w is defined by the network and represents the time interval between the deadline for receiving another join request and the end of a time slot.
4. At time $t_{S1}$, data volume meter 125 signals multicast charging unit 124 to add an entry to charging database 126 to store the data volume start value, $V_1$, for user terminal 110 using multicast session p. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | Null | $t_3$ |

5. From time $t_{S1}$ until time $t_3$, the multicast network is responsible for updating decryption key 118 for user terminal 110 whenever host membership in the multicast group changes. The updates to decryption key 118 occur during the offset interval w for each time slot. During the offset interval w, if the network determines that the status for a user will change from "joined" to "disjoined", the network updates decryption key 118.
6. At time $t_{S1}$, where $t_{X1}<t_{D1}$, user terminal 110 extends the stop time by sending a second join request to specify a later stop time. If the second join request takes the form join(p, $t_3$, 2), the user is requesting to extend the end time for the connection to multicast session p for 2 time slots after time $t_3$. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | Null | $t_5$ |

The multicast network informs user terminal 110 that time $t_{D2}$ is the deadline for extending the expiration of the connection to multicast session p.
7. From time $t_3$ to time $t_5$, the multicast network is responsible for updating decryption key 118 for user terminal 110 whenever host membership in the multicast group changes.
8. At time $t_{S2}$, where $t_{X2}<t_{D2}$, user terminal 110 sends a disjoin request that specifies to stop accruing a fee when the current time slot expires. If the disjoin request takes the form leave(p, 0), user terminal 110 is requesting to leave session p when the current time slot expires. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | Null | $t_4$ |

9. After time ($t_4$−w), if the network determines that the status for a user will change from "joined" to "disjoined", the network updates decryption key 118 and continues the multicast session for the user into the next time slot.
10. At time $t_4$, collection of the data volume charges for user terminal 110 stops. Data volume meter 125 communicates the data volume end value, $V_2$, for user terminal 110 using multicast session p to multicast charging unit 124. Multicast charging unit 124 updates the entry to charging database 126. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | $V_2$ | $t_4$ |

Since the collection of data volume charges has stopped, multicast charging unit 124 closes the entry in charging database 126 for user terminal 110 using multicast session p, communicates the charging data to billing unit 171 for storage in billing database 172, and deletes the entry in charging database 126. Since the charging data is summarized, the total volume of data for user terminal 110 using multicast session p is ($V_2$−$V_1$). In another embodiment, data volume meter 125 communicates the charging data to billing server 170 directly, without storing the charging data in charging database 126.

Referring to FIGS. 1B and 4B, if termination of the multicast session connection is implied from the passage of time, steps 1 through 7 are identical to steps 1 through 7 from the discussion of FIG. 4A and determination of the data volume comprises:
1. Data volume meter 125 examining IP multicast data packets and maintaining a tally of the number of bytes of data received, for a given destination address and multicast session. Data volume meter 125 can either be co-located with multicast charging unit 124 or located on an upper layer of the multicast tree (e.g., on the gateway router where the multicast data enters the multicast network). In one embodiment, each last hop router may include a meter for measuring the multicast session routed to the last hop router. In another embodiment, the meter can be distributed across several access routers in the multicast network.
2. User terminal 110 sending a join request to group membership management 122 at time $t_{X0}$. If the join request takes the form join(p, $t_{S1}$, 2), the user is requesting to join multicast session p, start the connection time charging at time $t_{S1}$, and pay for the service from the start time until time $t_3$=[($t_0$+m−$t_{S1}$)+(2×m)] where m is the duration of a time slot and $t_0$ is the start of a time slot. Calculation of the fee depends on the volume of data received by a given destination and multicast session between time $t_{S1}$ and $t_3$.
3. Multicast security client 113 receiving decryption key 118 from multicast security unit 123 before time $t_{S1}$. The multicast network informs user terminal 110 that time $t_{D1}$ is the deadline for sending another join request. The offset w is defined by the network and represents the time interval between the deadline for receiving another join request and the end of a time slot.
4. At time $t_{S1}$, data volume meter 125 signals multicast charging unit 124 to add an entry to charging database 126 to store the data volume start value, $V_1$, for user terminal 110 using multicast session p. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | Null | $t_3$ |

5. From time $t_{S1}$ until time $t_3$, the multicast network is responsible for updating decryption key 118 for user terminal 110 whenever host membership in the multicast group changes. The updates to decryption key 118 occur during the offset interval w for each time slot. During the offset interval w, if the network determines that the status for a user will change from "joined" to "disjoined", the network updates decryption key 118.
6. At time $t_{X1}$, where $t_{S1}$<$t_{D1}$, user terminal 110 extends the stop time by sending a second join request to specify a later stop time. If the second join request takes the form join(p, $t_3$, 2), the user is requesting to extend the end time for the connection to multicast session p for 2 time slots after time $t_3$. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | Null | $t_5$ |

The multicast network informs user terminal 110 that time $t_{D2}$ is the deadline for extending the expiration of the connection to multicast session p.
7. From time $t_3$ to time $t_5$, the multicast network is responsible for updating decryption key 118 for user terminal 110 whenever host membership in the multicast group changes.
8. After time $t_{D2}$, if the network determines that the status for a user will change from "joined" to "disjoined", the network updates decryption key 118 and continues the multicast session for the user into the next time slot.
9. At time $t_5$, collection of the data volume charges for user terminal 110 stops. Data volume meter 125 communicates the data volume end value, $V_3$, for user terminal 110 using multicast session p to multicast charging unit 124. Multicast charging unit 124 updates the entry to charging database 126. In one embodiment, the entry to charging database 126 appears as follows:

| User Identification | Session Identification | Data Volume on Meter | | Expiration Time of "Joined" Status |
|---|---|---|---|---|
| | | Start Value | End Value | |
| 21323421 | finnkino 457286529 1453 172.10.20.212 | $V_1$ | $V_3$ | $t_4$ |

Since the collection of data volume charges has stopped, multicast charging unit 124 closes the entry in charging database 126 for user terminal 110 using multicast session p, communicates the charging data to billing unit 171 for storage in billing database 172, and deletes the entry in charging database 126. Since the charging data is summarized, the total volume of data for user terminal 110 using multicast session p is $(V_3-V_1)$. In another embodiment, data volume meter 125 communicates the charging data to billing server 170 directly, without storing the charging data in charging database 126.

Although the embodiments disclosed herein describe a fully functioning system, method, and computer program product for calculating a cost of receiving multicast data from a multicast session, the reader should understand that other equivalent embodiments exist. Since numerous modifications and variations will occur to those who review this disclosure, the system, method, and computer program product for calculating a cost of receiving multicast data from a multicast session is not limited to the exact construction and operation illustrated and disclosed herein. Accordingly, this disclosure intends all suitable modifications and equivalents to fall within the scope of the claims.

What is claimed is:

1. A method for calculating a cost of receiving multicast data from a selected multicast session, a multicast network including at least one multicast service, each multicast service including at least one multicast session, comprising:
    receiving a request to establish a connection to the selected multicast session, the request including a start time for the connection and an end time for the connection;
    storing the start time for the connection and the end time for the connection; and
    after termination of the connection, calculating the cost of receiving the multicast data, wherein the multicast network utilizes a multicast protocol, and
    wherein when a selected multicast service that includes the selected multicast session receives a multicast message from a sender, the multicast protocol sends the multicast message to said at least one multicast session associated with the selected multicast service.

2. The method of claim 1, further comprising:
    receiving a subsequent request to extend the connection, the subsequent request specifying a new end time for the connection; and
    storing the new end time for the connection.

3. The method of claim 1, further comprising:
    receiving a subsequent request to terminate the connection, the subsequent request specifying a new end time that precedes the end time for the connection; and
    storing the new end time for the connection.

4. The method of claim 1, wherein the storing of the start time for the connection and the end time for the connection is to a database.

5. The method of claim 1, wherein time is divided into evenly spaced time slots, and wherein the start time for the connection the end time for the connection can only occur at the end of a time slot.

6. The method of claim 5, wherein the end time for the connection in the request is specified as a discrete number of time slots.

7. The method of claim 1, wherein the calculating of the cost further comprises:
    computing a charge for receiving the multicast data;
    storing the charge; and
    computing the cost by multiplying the charge by a fee for the multicast service associated with the selected multicast session.

8. The method of claim 7, wherein the computing of the charge further comprises:
    computing an elapsed connection time by subtracting the start time for the connection from the end time for the connection.

9. The method of claim 7, wherein the computing of the charge further comprises:
    computing a volume of data received over the connection from the start time for the connection to the end time for the connection.

10. The method of claim 7, wherein the storing of the charge is to a database.

11. A system for calculating a cost of receiving multicast data from a selected multicast session, a multicast network including at least one multicast service, each multicast service including at least one multicast session, comprising:
    a memory device; and
    a processor disposed in communication with the memory device, the processor configured to:
        receive a request to establish a connection to the selected multicast session, the request including a start time for the connection and an end time for the connection;
        store the start time for the connection and the end time for the connection; and
        after termination of the connection, calculate the cost of receiving the multicast data,
        wherein the multicast network utilizes a multicast protocol, and
        wherein when a selected multicast service that includes the selected multicast session receives a multicast message from a sender, the multicast protocol sends the multicast message to said at least one multicast session associated with the selected multicast service.

12. The system of claim 11, wherein the processor is further configured to:
    receive a subsequent request to extend the connection, the subsequent request specifying a new end time for the connection; and
    store the new end time for the connection.

13. The system of claim 11, wherein the processor is further configured to:
    receive a subsequent request to terminate the connection, the subsequent request specifying a new end time that precedes the end time for the connection; and
    store the new end time for the connection.

14. The system of claim 11, wherein the processor stores the start time for the connection and the end time for the connection to a database.

15. The system of claim 11, wherein time is divided into evenly spaced time slots, and wherein the start time for the connection the end time for the connection can only occur at the end of a time slot.

16. The system of claim 15, wherein the end time for the connection in the request is specified as a discrete number of time slots.

17. The system of claim 11, wherein to calculate the cost, the processor is further configured to:
compute a charge for receiving the multicast data;
store the charge; and
compute the cost by multiplying the charge by a fee for the multicast service associated with the selected multicast session.

18. The system of claim 17, wherein to compute the charge, the processor is further configured to:
compute an elapsed connection time by subtracting the start time for the connection from the end time for the connection.

19. The system of claim 17, wherein to compute the charge, the processor is further configured to:
compute a volume of data received over the connection from the start time for the connection to the end time for the connection.

20. The system of claim 17, wherein the processor stores the charge to a database.

21. A computer program product comprising a computer readable medium containing computer program logic recorded thereon when executed by a processor in communication with said computer readable medium executing the computer program logic for calculating a cost of receiving multicast data from a selected multicast session, a multicast network including at least one multicast service, each multicast service including at least one multicast session, the computer program logic comprising:
program code for receiving a request to establish a connection to the selected multicast session, the request including a start time for the connection and an end time for the connection;
program code for storing the start time for the connection and the end time for the connection; and
after termination of the connection, program code for calculating the cost of receiving the multicast data,
wherein the multicast network utilizes a multicast protocol, and
wherein when a selected multicast service that includes the selected multicast session receives a multicast message from a sender, the multicast protocol sends the multicast message to said at least one multicast session associated with the selected multicast service.

22. The computer program product of claim 21, the computer program logic further comprising:
program code for receiving a subsequent request to extend the connection, the subsequent request specifying a new end time for the connection; and
program code for storing the new end time for the connection.

23. The computer program product of claim 21, the computer program logic further comprising:
program code for receiving a subsequent request to terminate the connection, the subsequent request specifying a new end time that precedes the end time for the connection; and
program code for storing the new end time for the connection.

24. The computer program product of claim 21, wherein the storing of the start time for the connection and the end time for the connection is to a database.

25. The computer program product of claim 21, wherein time is divided into evenly spaced time slots, and wherein the start time for the connection the end time for the connection can only occur at the end of a time slot.

26. The computer program product of claim 25, wherein the end time for the connection in the request is specified as a discrete number of time slots.

27. The computer program product of claim 21, wherein the program code for calculating the cost further comprises:
program code for computing a charge for receiving the multicast data;
program code for storing the charge; and
program code for computing the cost by multiplying the charge by a fee for the multicast service associated with the selected multicast session.

28. The computer program product of claim 27, wherein the program code for computing the charge further comprises:
program code for computing an elapsed connection time by subtracting the start time for the connection from the end time for the connection.

29. The computer program product of claim 27, wherein the program code for computing the charge further comprises:
program code for computing a volume of data received over the connection from the start time for the connection to the end time for the connection.

30. The computer program product of claim 27, wherein the storing of the charge is to a database.

31. A system for calculating a cost of receiving multicast data from a selected multicast session, a multicast network including at least one multicast service, each multicast service including at least one multicast session, comprising:
a collection device comprising:
a collection memory device; and
a collection processor disposed in communication with the collection memory device, the collection processor configured to:
receive a request to establish a connection to the selected multicast session, the request including a start time for the connection and an end time for the connection;
store the start time for the connection and the end time for the connection; and
after termination of the connection, calculate the cost of receiving the multicast data,
wherein the multicast network utilizes a multicast protocol, and
wherein when a selected multicast service that includes the selected multicast session receives a multicast message from a sender, the multicast protocol sends the multicast message to said at least one multicast session associated with the selected multicast service; and
an interface device comprising:
an interface memory device; and
an interface processor disposed in communication with the interface memory device, the interface processor configured to:
configure the collection device; and
display the cost of receiving the multicast data.

32. The system of claim 31, wherein the collection processor is further configured to:
receive a subsequent request to extend the connection that specifies a new end time for the connection; and
store the new end time for the connection.

33. The system of claim 31, wherein the collection processor is further configured to:
receive a subsequent request to terminate the connection that specifies a new end time for the connection; and
store the new end time for the connection.

34. The system of claim 31, wherein the collection processor stores the start time for the connection and the end time for the connection to a database.

35. The system of claim 31, wherein time is divided into evenly spaced time slots, and wherein the start time for the connection the end time for the connection can only occur at the end of a time slot.

36. The system of claim 35, wherein the end time for the connection in the request is specified as a discrete number of time slots.

37. The system of claim 31, wherein to calculate the cost, the collection processor is further configured to:
compute a charge for receiving the multicast data;
store the charge; and
compute the cost by multiplying the charge by a fee for the multicast service associated with the selected multicast session.

38. The system of claim 37, wherein to compute the charge, the collection processor is further configured to:
compute an elapsed connection time by subtracting the start time for the connection from the end time for the connection.

39. The system of claim 37, wherein to compute the charge, the collection processor is further configured to:
compute a volume of data received over the connection from the start time for the connection to the end time for the connection.

40. The system of claim 37, wherein the collection processor stores the charge to a database.

41. A computer program product comprising a computer readable medium containing computer program logic recorded thereon when executed by a processor in communication with said computer readable medium executing the computer program logic for calculating a cost of receiving multicast data from a selected multicast session, a multicast network including at least one multicast service, each multicast service including at least one multicast session, the computer program logic comprising:
program code for sending a request to establish a connection to the selected multicast session, the request including a start time for the connection and an end time for the connection;
program code for sending a first subsequent request after the request, the first subsequent request including a new end time for the connection, the new end time being later than the end time; and
program code for sending a second subsequent request after the first subsequent request, the second subsequent request including an earlier end time for the connection, the earlier end time after the end time and before the new end time,
wherein the multicast network utilizes a multicast protocol, and
wherein when a selected multicast service that includes the selected multicast session receives a multicast message from a sender, the multicast protocol sends the multicast message to said at least one multicast session associated with the selected multicast service.

42. The computer program product of claim 41, the computer program logic further comprising:
program code for determining a request time interval;
wherein sending the request, sending the first subsequent request, and sending the second subsequent request only occur at a time that is a multiple of the request time interval from the start time.

* * * * *